United States Patent
Ran et al.

(10) Patent No.: US 10,726,501 B1
(45) Date of Patent: Jul. 28, 2020

(54) METHOD TO USE TRANSACTION, ACCOUNT, AND COMPANY SIMILARITY CLUSTERS DERIVED FROM THE HISTORIC TRANSACTION DATA TO MATCH NEW TRANSACTIONS TO ACCOUNTS

(71) Applicant: Intuit Inc., Mountain View, CA (US)

(72) Inventors: Alexander S. Ran, Palo Alto, CA (US); Christopher Lesner, Palo Alto, CA (US); Marko Rukonic, San Jose, CA (US); Wei Wang, San Jose, CA (US)

(73) Assignee: Intuit Inc., Mountain View, CA (US)

( * ) Notice: Subject to any disclaimer, the term of this patent is extended or adjusted under 35 U.S.C. 154(b) by 255 days.

(21) Appl. No.: 15/496,630

(22) Filed: Apr. 25, 2017

(51) Int. Cl.
| | | |
|---|---|---|
| *G07B 17/00* | (2006.01) | |
| *G06Q 40/00* | (2012.01) | |
| *G06F 7/24* | (2006.01) | |
| *G06F 16/28* | (2019.01) | |

(52) U.S. Cl.
CPC .............. *G06Q 40/12* (2013.12); *G06F 7/24* (2013.01); *G06F 16/285* (2019.01)

(58) Field of Classification Search
CPC .............................. G06Q 40/12; G06F 16/285
USPC ..................................................... 705/16, 30
See application file for complete search history.

(56) References Cited

U.S. PATENT DOCUMENTS

| | | |
|---|---|---|
| 7,283,999 B1 | 10/2007 | Ramesh et al. |
| 7,428,636 B1 | 9/2008 | Waldspurger et al. |
| 7,457,950 B1 | 11/2008 | Brickell et al. |
| 7,668,769 B2 | 2/2010 | Baker et al. |
| 7,702,683 B1 | 4/2010 | Kirshenbaum |
| 7,815,106 B1 | 10/2010 | McConnell |
| 7,865,829 B1 | 1/2011 | Goldfield et al. |
| 7,890,754 B2 | 2/2011 | Waldspurger et al. |
| 8,024,660 B1 | 9/2011 | Quinn et al. |
| 8,037,145 B2 | 10/2011 | Bunker et al. |
| 8,046,298 B1 | 10/2011 | Voth et al. |
| 8,321,319 B1 | 11/2012 | Grossblatt et al. |
| 8,321,357 B2 | 11/2012 | Lapir et al. |
| 8,374,986 B2 | 2/2013 | Indeck et al. |
| 8,494,929 B1 | 7/2013 | Borgen et al. |

(Continued)

FOREIGN PATENT DOCUMENTS

| | | |
|---|---|---|
| JP | 5850592 | 12/2015 |
| WO | WO 2014/074075 | 5/2014 |

OTHER PUBLICATIONS

Hull, et al., "Paper Based Augmented Reality;" Artificial Reality and Telexistence, 17th International Conference, pp. 205-209; IEEE, 2007.

*Primary Examiner* — Rokib Masud
(74) *Attorney, Agent, or Firm* — Paradice and Li LLP

(57) ABSTRACT

A method and system groups user accounts in a financial management system based on the similarities of the financial transactions associated with the accounts. The method and system groups merchants involved in the financial transactions based on how financial transactions involving the merchants are sorted into groups of merchants. The method and system group users based on how the users sort financial transactions into their accounts. The method and system assist users to sort future financial transactions based on the groups of accounts, the groups of merchants, and the groups of users.

31 Claims, 4 Drawing Sheets

(56) References Cited

U.S. PATENT DOCUMENTS

| | | |
|---|---|---|
| 8,544,726 B1 | 10/2013 | Hahn |
| 8,571,919 B2 | 10/2013 | Rane et al. |
| 8,655,862 B1 | 2/2014 | Riley et al. |
| 8,661,038 B1 | 2/2014 | Whittam et al. |
| 8,688,557 B2 | 4/2014 | Rose et al. |
| 8,719,120 B1 | 5/2014 | McVickar et al. |
| 8,798,354 B1 | 8/2014 | Bunzel et al. |
| 8,855,377 B1 | 10/2014 | Madhani |
| 8,892,597 B1 | 11/2014 | Strohman |
| 8,949,371 B1 | 2/2015 | Shrowty |
| 8,977,626 B2 | 3/2015 | Hess |
| 9,031,873 B2 | 5/2015 | Parson et al. |
| 9,047,243 B2 | 6/2015 | Taylor et al. |
| 9,305,056 B1 | 4/2016 | Gupta et al. |
| 9,348,857 B2 | 5/2016 | Glover |
| 9,760,548 B2 | 9/2017 | Cooke et al. |
| 9,904,959 B2 | 2/2018 | Katz et al. |
| 9,916,383 B1 | 3/2018 | Ching |
| 10,229,100 B1 | 3/2019 | Lesner et al. |
| 10,460,298 B1 | 10/2019 | Ran et al. |
| 2003/0078882 A1 | 4/2003 | Sukeda et al. |
| 2004/0215543 A1 | 10/2004 | Betz et al. |
| 2004/0225509 A1 | 11/2004 | Andre |
| 2004/0249745 A1 | 12/2004 | Baaren |
| 2005/0015296 A1 | 1/2005 | Dougan |
| 2005/0080701 A1 | 4/2005 | Tunney et al. |
| 2005/0091151 A1 | 4/2005 | Coleman et al. |
| 2005/0120004 A1 | 6/2005 | Stata et al. |
| 2005/0222929 A1 | 10/2005 | Steier et al. |
| 2005/0268217 A1 | 12/2005 | Garrison |
| 2006/0200754 A1 | 9/2006 | Kablesh et al. |
| 2006/0294311 A1 | 12/2006 | Fu et al. |
| 2008/0027787 A1 | 1/2008 | Malsbenden et al. |
| 2008/0077488 A1 | 3/2008 | Main et al. |
| 2008/0086403 A1 | 4/2008 | Dilip et al. |
| 2008/0320056 A1 | 12/2008 | Mohanan et al. |
| 2008/0320316 A1 | 12/2008 | Waldspurger et al. |
| 2009/0144239 A1 | 6/2009 | Bevis et al. |
| 2009/0183159 A1 | 7/2009 | Michael et al. |
| 2009/0234683 A1 | 9/2009 | Anderson et al. |
| 2009/0265198 A1 | 10/2009 | Lester et al. |
| 2009/0276289 A1 | 11/2009 | Dickinson et al. |
| 2009/0292632 A1 | 11/2009 | Dheer et al. |
| 2010/0250338 A1 | 9/2010 | Banerjee et al. |
| 2010/0306032 A1 | 12/2010 | Jolley |
| 2011/0022523 A1 | 1/2011 | Ruan |
| 2011/0078098 A1 | 3/2011 | Lapir et al. |
| 2011/0087606 A1 | 4/2011 | Hammond et al. |
| 2011/0178841 A1 | 7/2011 | Rane et al. |
| 2011/0178842 A1 | 7/2011 | Rane et al. |
| 2011/0178844 A1 | 7/2011 | Rane et al. |
| 2011/0178845 A1 | 7/2011 | Rane et al. |
| 2011/0178847 A1 | 7/2011 | Rane et al. |
| 2011/0178848 A1 | 7/2011 | Rane et al. |
| 2011/0178849 A1 | 7/2011 | Rane et al. |
| 2011/0208588 A1 | 8/2011 | Joa et al. |
| 2011/0246268 A1 | 10/2011 | Satyavolu et al. |
| 2011/0264497 A1 | 10/2011 | Clyne |
| 2012/0004968 A1 | 1/2012 | Satyavolu et al. |
| 2012/0053987 A1 | 3/2012 | Satyavolu et al. |
| 2012/0054049 A1 | 3/2012 | Hayes |
| 2012/0078766 A1 | 3/2012 | Rose et al. |
| 2012/0109723 A1 | 5/2012 | Crooks et al. |
| 2012/0109749 A1 | 5/2012 | Subramanian et al. |
| 2013/0006829 A1* | 1/2013 | Fairweather ........... G06Q 40/04 705/37 |
| 2013/0013491 A1 | 1/2013 | Selway et al. |
| 2013/0073464 A1 | 3/2013 | Magpayo et al. |
| 2013/0133048 A1 | 5/2013 | Wyn-Harris |
| 2013/0159449 A1 | 6/2013 | Taylor et al. |
| 2013/0232042 A1 | 9/2013 | Simpson et al. |
| 2013/0232043 A1 | 9/2013 | Patel |
| 2013/0238487 A1 | 9/2013 | Biske |
| 2013/0268340 A1 | 10/2013 | Colon et al. |
| 2013/0272523 A1 | 10/2013 | McCorkindale et al. |
| 2013/0325548 A1 | 12/2013 | Kulkarni et al. |
| 2013/0325674 A1 | 12/2013 | Yeri et al. |
| 2013/0325680 A1 | 12/2013 | Satyavolu et al. |
| 2013/0325681 A1 | 12/2013 | Somashekar et al. |
| 2013/0325716 A1 | 12/2013 | Yeri et al. |
| 2013/0346274 A1 | 12/2013 | Ferdinand et al. |
| 2014/0041047 A1 | 2/2014 | Jaye et al. |
| 2014/0052594 A1 | 2/2014 | Zimmer et al. |
| 2014/0089186 A1 | 3/2014 | Dunn et al. |
| 2014/0095486 A1 | 4/2014 | Caldwell |
| 2014/0132608 A1 | 5/2014 | Mund et al. |
| 2014/0149401 A1 | 5/2014 | Liu et al. |
| 2014/0180826 A1 | 6/2014 | Boal |
| 2014/0188756 A1 | 7/2014 | Ponnavaikko et al. |
| 2014/0195395 A1 | 7/2014 | Bhakta et al. |
| 2014/0195398 A1* | 7/2014 | Rose ................ G06Q 40/00 705/35 |
| 2014/0201102 A1 | 7/2014 | Srinivasan et al. |
| 2014/0207524 A1 | 7/2014 | Just |
| 2014/0222530 A1 | 8/2014 | Wegner et al. |
| 2014/0230053 A1 | 8/2014 | Mote et al. |
| 2014/0244457 A1 | 8/2014 | Howell et al. |
| 2014/0258023 A1 | 9/2014 | Joa et al. |
| 2014/0258063 A1 | 9/2014 | Chourasia et al. |
| 2014/0279311 A1 | 9/2014 | Just |
| 2014/0304130 A1 | 10/2014 | Winters et al. |
| 2015/0051953 A1 | 2/2015 | Howe |
| 2015/0095356 A1 | 4/2015 | Wu |
| 2015/0142624 A1 | 5/2015 | Buttonow et al. |
| 2015/0149892 A1 | 5/2015 | Roy et al. |
| 2015/0178856 A1 | 6/2015 | Flores |
| 2015/0186495 A1 | 7/2015 | Abbas et al. |
| 2015/0188751 A1 | 7/2015 | Vasseur et al. |
| 2015/0193790 A1* | 7/2015 | Weinberger ........ G06Q 30/0205 705/7.31 |
| 2015/0205777 A1 | 7/2015 | Campanelli et al. |
| 2015/0206109 A1 | 7/2015 | Caldwell et al. |
| 2015/0244892 A1 | 8/2015 | Arputharaj et al. |
| 2015/0248391 A1 | 9/2015 | Watanabe |
| 2015/0324410 A1 | 11/2015 | Glover |
| 2015/0363704 A1 | 12/2015 | Yong et al. |
| 2015/0379430 A1 | 12/2015 | Dirac et al. |
| 2016/0063645 A1 | 3/2016 | Houseworth et al. |
| 2016/0098790 A1 | 4/2016 | Herman et al. |
| 2016/0125337 A1 | 5/2016 | von Walstrom et al. |
| 2016/0125400 A1 | 5/2016 | Hu et al. |
| 2016/0132857 A1 | 5/2016 | Unser et al. |
| 2016/0196577 A1 | 7/2016 | Reese |
| 2016/0217119 A1 | 7/2016 | Dakin et al. |
| 2016/0247175 A1 | 8/2016 | Milton et al. |
| 2017/0053012 A1 | 2/2017 | Levy et al. |
| 2017/0148025 A1 | 5/2017 | Le et al. |
| 2017/0178135 A1 | 6/2017 | Bull et al. |
| 2017/0193045 A1 | 7/2017 | Young et al. |
| 2017/0262421 A1 | 9/2017 | Yue |
| 2017/0270521 A1 | 9/2017 | Good et al. |
| 2017/0278111 A1 | 9/2017 | Gerard |
| 2017/0316506 A1 | 11/2017 | Lesner et al. |
| 2017/0262872 A1 | 12/2017 | Fischer et al. |
| 2018/0032973 A1* | 2/2018 | Sharma .................. G06Q 20/04 |
| 2018/0174170 A1 | 6/2018 | Lo Faro et al. |
| 2018/0211330 A1 | 7/2018 | Ran et al. |
| 2018/0260910 A1 | 9/2018 | Just |
| 2018/0315059 A1 | 11/2018 | Venkatesh et al. |
| 2019/0005012 A1 | 1/2019 | Priestas et al. |

\* cited by examiner

METHOD TO USE TRANSACTION, ACCOUNT, AND COMPANY SIMILARITY CLUSTERS DERIVED FROM THE HISTORIC TRANSACTION DATA TO MATCH NEW TRANSACTIONS TO ACCOUNTS

BACKGROUND

Every year millions of people, businesses, and organizations around the world use electronic financial management systems, such as electronic accounting systems, to help manage their finances. Electronic accounting systems use accounts for categorization of business transactions. Such electronic accounting systems gather data related to financial transactions of the users. The users can then sort the financial transactions into the various accounts in order to track their expenditures and revenues by category. The users can monitor many or all of their financial transactions and other financial matters from a single electronic accounting system and sort them into the various financial accounts. Such an electronic accounting system can help users to save time by eliminating the need to check with several different financial institutions in order to manage their finances. However, traditional financial management systems are unable to optimize the financial management services provided to their users because the traditional financial management systems are not able to adequately assist users in sorting their financial transactions into their various accounts.

For instance, some traditional financial management systems enable users to generate and name the various accounts into which the users will sort their financial transactions. Traditional financial management systems may attempt to recommend that the user sort the financial transaction into a particular account based on the name of the account. However, the names of the accounts chosen by users are often not adequate, by themselves, to enable a traditional financial management system to discern the true nature of the accounts. Accordingly, traditional financial management systems may suggest unrelated accounts or may not be able to make any suggestion at all. In the case that the traditional financial management system does not recommend any account to the user, the user is often forced to scroll through an entire chart of accounts each time the user seeks to sort a financial transaction into an account. This can be tedious and time consuming. In the case that the traditional financial management system makes a faulty account recommendation, this can distract the user and force the user into extra work in attempting to find the right account into which to sort the financial transaction. These inconveniences are magnified when the user uses a mobile device to sort financial transactions.

The inability of traditional financial systems to adequately understand the nature of user-created accounts results in under-utilization of the potential of electronic financial management systems. For example, traditional financial management systems cannot adequately automate the process of sorting electronic financial transactions of the users. This results in wasted time and resources for both the users and the financial management systems. Furthermore, users may decide not to use the financial management system due to the inconvenience of the manual sorting process, or, worse yet, users may abandon the traditional financial management system because the traditional financial management system often erroneously sorts financial transactions into user accounts. The unrealized potential extends beyond merely assisting with the sorting process. A financial management system that understands the nature of the users' financial accounting and business practices can offer better data management services to the users and to third-parties.

What is needed is a method and system that solves the long standing technical problem of electronic financial management systems that are not able to accurately and efficiently assist users in sorting their financial transactions into the proper accounts.

SUMMARY

Embodiments of the present disclosure address some of the shortcomings associated with traditional financial management systems by providing methods and systems for sorting financial transactions into accounts based on account groups, merchant groups, and user groups. Embodiments of the present disclosure utilize the fact a financial management system in accordance with embodiments of the present disclosure has access to a large set of financial management data including financial transactions that have already been sorted into the various accounts of the large number of users of the financial management system. Embodiments of the present disclosure analyze the financial management data and generate account grouping data, transaction grouping data, and user grouping data. The account grouping data identifies accounts that are similar to each other and forms groups of similar accounts based on the financial transactions that the users have assigned to the accounts. The transaction grouping data identifies groups of financial transactions based on the characteristics of the financial transactions, such as the merchant involved in the financial transaction. The user grouping data identifies groups of users of the financial management system based on the accounts they have and the way that they assign financial transactions to the accounts. Embodiments of the present disclosure utilize the account grouping data, the transaction grouping data, and the user grouping data in order to assist in sorting new financial transactions of the users into the correct accounts of the users. Thus, when a user has a new financial transaction with a particular merchant, the financial management system is not limited to merely analyzing how that user has categorized financial transactions with that merchant in the past. Indeed, it is quite likely that the user has not previously had a financial transaction with that merchant. However, due to the large number of users, accounts of the users, and financial transactions of the users, it is highly likely that the merchant involved in the new financial transaction has been involved with financial transactions with other users and is already associated with one or more groups of financial transactions and that the one or more groups of financial transactions is associated with one or more groups of accounts. Thus, it is highly likely that for the new financial transaction of, an accurate prediction can be made as to which group of accounts the financial transaction should be assigned, and therefore into which account of the current user the financial transaction should be sorted. Embodiments of the present disclosure can match the user to one or more groups of users, can identify groups of accounts associated with the one or more groups of users, can identify one or more groups of financial transactions associated with the new financial transaction, can match an account of the user to the one or more groups of accounts, and can assist the user in sorting the new financial transaction into the account of the user. In this way, embodiments of the present disclosure can assist users in quickly and accurately sorting their financial transactions by utilizing groups of users, groups of financial transactions, and groups of accounts. Embodiments of the present disclosure overcome some of the drawbacks of traditional financial management systems by providing a financial management system that can quickly and accurately assist users in sorting financial transactions.

In one embodiment, the financial management system receives financial transaction data associated with financial transactions of the user. The financial transaction data includes, for each financial transaction, financial transaction description data. The financial transaction description data can include data identifying the merchant involved in the financial transaction, such as a name of the merchant or a merchant string. The financial transaction description data can include data indicating a business category code for the merchant, a monetary amount of the transaction, a time of the transaction, a location of the transaction, or other data related to the financial transaction. The merchant string can include all or part of a name of the merchant, an address of the merchant, a type of business of the merchant, an identification code associated with the merchant, or other types of data. Financial transactions with a particular merchant will often include the same merchant string or description string. In other cases, the financial management system will undertake other procedures to identify the merchant involved in a particular financial transaction by analyzing the description string. Thus, each financial transaction is associated with a particular merchant.

In one embodiment, the groups of financial transactions are based on the merchants involved in the financial transactions. Accordingly, groups of financial transactions may be defined by the merchants involved in the financial transactions. Thus, in one embodiment, groups of financial transactions are groups of merchants and the financial transaction grouping data is merchant grouping data. Alternatively, the groups of financial transactions can be formed based on other characteristics of the financial transactions including business category codes, days of the week on which the financial transactions occurred, time of the day on which financial transactions occurred, monetary amounts of the financial transactions, geolocations of the financial transactions, financial institutions or financial accounts associated with the financial transaction, or other characteristics.

In one embodiment, when the financial management system receives financial transaction data related to a financial transaction of a user of the financial management system, the financial management system take steps to assist the user in sorting the financial transaction into one or more of the user's accounts based on the account grouping data, the transaction grouping data, and the user grouping data. In particular, the financial management system identifies a group of users to which the user belongs based on the way that the user has previously sorted financial transactions into the accounts of the user. The financial management system then analyzes the financial transaction data related to the financial transaction and matches the financial transaction to one or more groups of financial transactions from the transaction grouping data, for example, be identifying the merchant or merchant string of the financial transaction and identifying one or more groups of financial transactions associated with the merchant. The financial management system then identifies one or more groups of accounts from the account grouping data associated with the one or more group of transactions and the one or more groups of users. The financial management system identifies whether the user has any accounts included in the one or more groups of accounts associated with the one or more groups of financial transactions. If the financial management system has found an account, or a small number of accounts, that are likely a match for the financial transaction, then the financial management system can take steps to assist the user in sorting the financial transaction into one of these accounts. The financial management system can assist the user by outputting message data to the user identifying the one or more accounts and can prompt the user to sort the financial transaction into one of these accounts. In some cases, the financial management system can present the candidate accounts in order of estimated likelihood that the financial transaction should be sorted into that account based on the account grouping data, the transaction grouping data, and the user grouping data. In some cases, the financial management system can identify with a high degree of certainly a single account into which the financial transaction should be sorted. The financial management system can present message data that prompts the user to sort the financial transaction into that account.

In one embodiment, the financial management system can automatically sort the financial transaction into an account of the user if the financial management system determines that the likelihood that the financial transaction should be sorted into that account is greater than a threshold likelihood based on the account grouping data, the transaction grouping data, and the user grouping data. The financial management system can output message data to the user informing the user that the financial management system has sorted the financial transaction into the account. The message data can also include a prompt asking the user to confirm that a financial management system has correctly sorted the financial transaction into the account. The message data can include a prompt asking the user to affirm that the financial management system should sort the financial transaction to the account. The message data can include an opportunity for the user to undo the sorting or to prevent the sorting.

In one embodiment, if the financial management system has not identified a single likely account, or a very small number of likely accounts, then the financial management system can take additional steps to identify an account of the user into which the financial transaction should be sorted. The financial management can analyze all of the characteristics of the financial transaction, including merchant name, monetary amount, business category code, financial institution, day of the week, merchant group, account, or other features. The financial management system can assign weight values to the various features of the financial transaction indicating how strongly the features predict inclusion into an account or group of accounts. The financial management system can generate weight values for the various features by minimizing prediction loss over a cross validation set of financial transactions using methods of gradient the scent and regularization. The financial management system can identify, for a financial transaction, candidate accounts of the user based on this additional analysis.

In one embodiment, the financial management system assigns each new financial transaction to a group of accounts from the account grouping data and to a group of transactions from the transaction grouping data. Because these attributes are appropriately scaled to be present in the chart of accounts of most users, the financial management system can perform transaction classification to the chart of accounts of the user using a classification methodology such as Naïve Bayes, logistic regression, KNN, or another classification technique. The financial management system can pre-compute the distribution of transaction documents including merchant group and account group for all accounts of the user and can sort the new transaction, or assist the user to sort the new transaction, into the account with the highest count of transaction features.

In one embodiment, it is possible that the user of the financial management system may have in the user's chart of accounts, empty the accounts that hold no financial transactions at all. The financial management system uses the name of the empty accounts and other known attributes of the empty accounts to assign the empty account to an account group from the grouping data by similarity of the attributes of the accounts found in the groups of accounts. Once the empty accounts have been matched to groups of accounts from the account grouping data, the financial management system can include the empty accounts in the transaction sorting process. The financial management system can assign a new financial transaction to an empty account that is matched to a group of accounts associated with the new financial transaction when no other account in the chart of accounts of the user matches the features of the new financial transaction.

In one embodiment, the financial management system generates account grouping data by first generating account characteristics vector data. The account characteristics vector data includes, for each of the various accounts of the various users of the financial management system, a respective account characteristics vector. Each account characteristics vector includes a plurality of data fields. Each data field is associated with one or more merchants. Each data field includes a respective data entry in the data field. The data entry in a data field of an account characteristics vector is an indication of a number or proportion of financial transactions of the account that involve the merchant or merchants associated with the data field. Embodiments of the present disclosure generate account grouping data including groups of similar accounts by analyzing the account characteristics vectors of all of the accounts and identifying account characteristics vectors that are similar to each other. If two account characteristics vectors are similar to each other, then the accounts that they represent are also similar to each other. The accounts are grouped based on the similarity of the financial transactions that are assigned to them. By extension, the accounts are grouped based on the merchants that are involved in the financial transactions assigned to the accounts. Further details regarding processes for grouping of accounts is found in U.S. patent application Ser. No. 15/416,547, filed on Jan. 26, 2017, titled Method to Determine Account Similarity in an Online Accounting System, which application is incorporated herein by reference in its entirety.

In one embodiment, the financial management system generates transaction grouping data by first generating transaction characteristics vector data. The transaction characteristics vector data includes, for each merchant, merchant identification, or merchant string, a respective transaction characteristics vector related to the financial transactions conducted with that merchant. Thus, each transaction characteristics vector represents a particular merchant, merchant identification, or merchant string. Each transaction characteristics vector includes a plurality of data fields. Each data field of the transaction characteristics vector is associated with an account or a group of accounts from the grouping data. Each data field of the transaction characteristics vector includes a respective data entry in the data field. The data entry in a data field of a transaction characteristics vector is an indication of a proportion of the total number of financial transactions involving the merchant that have been sorted into the account or group of accounts corresponding to the data field. Embodiments of the present disclosure generate transaction grouping data including groups of similar merchants or by analyzing the transaction characteristics vectors associated with the merchants or transaction descriptions and identifying transaction characteristics vectors that are similar to each other. If two transaction characteristics vectors are similar to each other, then the merchants that they represent are also similar to each other. The merchants are grouped based on the similarity of the accounts into which the financial transactions associated with the merchants are sorted. In one embodiment, the transaction characteristics vector data can be considered merchant characteristics vector data, and each transaction characteristics vector can be considered a merchant characteristics vector.

In one embodiment, the financial management system generates user grouping data based on the similarities in how the users assign the merchant groups to the account groups. Users that sort financial transactions associated with the merchant groups into account groups in a similar way are grouped together. Thus, the groups of users correspond to users that utilize accounts in similar ways.

In one embodiment, by generating the account grouping data and transaction grouping data, the financial management system assigns every financial transaction to a group of financial transactions from the transaction grouping data and to a group of accounts with the group of financial transactions.

In one embodiment, the financial management system generates the account grouping data by analyzing the account characteristics vector data with one or more grouping or clustering algorithms. The financial management system generates the account grouping data by analyzing each of the account characteristics vectors with the one or more grouping or clustering algorithms. The grouping or clustering algorithms indicate which vectors are similar to each other by grouping or clustering the vectors that are similar to each other. In one embodiment, the one or more grouping or clustering algorithms include one or more of a k-means clustering algorithm, a density-based spatial clustering of applications with noise (DBSCAN) clustering algorithm, or an affinity propagation clustering algorithm.

In one embodiment, the data value in a given data field of an account characterization vector is an indication of a number, frequency, rate, or proportion of financial transactions of the account that involve the merchant associated with that data field. Thus, in one embodiment, a higher data value can indicate that more financial transactions from the account involve the one or more merchants associated with the data field.

In one embodiment, the financial management system generates the data values for the data fields of the account characteristics vector by using a term frequency inverse document frequency (TF-IDF) calculation. In a TF-IDF calculation for generating a single data value in a single data field of a single account, the financial management system counts the fraction of financial transactions assigned to that account that involve the one or more merchants associated with the data field. The financial management system then counts the total number of accounts that include a financial transaction involving the one or more merchants. The financial management system then generates the data value by multiplying the number of financial transactions from the account by the logarithm of the inverse of the total fraction of accounts that include a financial transaction with the one or more merchants associated with the data field for which the data value is being computed. The financial management system can generate data values for each data field of the account characteristics vector using the TF-IDF process.

In one embodiment, the financial management system can generate the data values for the data fields of the account characteristics vectors by taking the logarithm of the result of the TF-IDF process. Thus, the data value in a given data field of a given account vector can correspond to the logarithm of a number generated by the TF-IDF process. In one embodiment, the financial management system uses a base 2 logarithm for the calculation. Alternatively, the financial management system can use a logarithm with a base other than 2.

The disclosed embodiments provide one or more technical solutions to the technical problem of providing financial management systems dynamically assist users to sort their financial transactions into the correct accounts. These and other embodiments of the financial management system are discussed in further detail below.

Assisting users to sort financial transactions into user accounts based on transaction grouping data, account grouping data, and user grouping data does not constitute an abstract idea, but rather represents a technical solution to a technical problem of financial management systems that are unable to effectively assist users in categorizing financial transactions. First, assisting users to sort financial transactions into user accounts based on transaction grouping data, account grouping data, and user grouping data is not an abstract idea because it is not merely an idea itself (e.g., can be performed mentally or using pen and paper). Second, assisting users to sort financial transactions into user accounts based on transaction grouping data, account grouping data, and user grouping data is not an abstract idea because it is not a fundamental economic practice (e.g., is not merely creating a contractual relationship, hedging, mitigating a settlement risk, etc.). Third, assisting users to sort financial transactions into user accounts based on transaction grouping data, account grouping data, and user grouping data is not an abstract idea because it is not a method of organizing human activity (e.g., managing a game of bingo). Fourth, although mathematics may be used to generate an analytics model, the disclosed and claimed methods and systems of assisting users to sort financial transactions into user accounts based on transaction grouping data, account grouping data, and user grouping data are not an abstract idea because the methods and systems are not simply a mathematical relationship/formula.

Assisting users to sort financial transactions into user accounts based on transaction grouping data, account grouping data, and user grouping data is not an abstract idea because having an accounting system understand the actual usage patterns of each user's account yields significant improvement to the technical fields of user experience, customer service, customer retention, and electronic financial management, according to one embodiment. The present disclosure adds significantly to the field of electronic financial management because the disclosed financial management system increases the knowledge of the needs and purposes of users of the financial management system, increases the ability of the financial management system to provide automated assistance in sorting, grouping and categorizing financial transactions, increases the likelihood of improving/maintaining a user's trust in the financial management system; and reduces the amount of time users spend managing their finances, according to one embodiment.

As a result, embodiments of the present disclosure allow for reduced use of processor cycles, memory, and power consumption, by reducing the time spent by users sorting financial transactions. Consequently, computing and communication systems implementing or providing the embodiments of the present disclosure are transformed into more operationally efficient devices and systems.

In addition to improving overall computing performance, assisting users to sort financial transactions into user accounts based on transaction grouping data, account grouping data, and user grouping data significantly improves the field of financial management systems by reducing the amount of time it takes for a user to sort financial transactions, according to one embodiment. Therefore, both human and non-human resources are utilized more efficiently. Furthermore, by assisting users to sort financial transactions into user accounts based on transaction grouping data, account grouping data, and user grouping data, loyalty in the financial management system is increased. This results in repeat customers, efficient financial management services, and reduced abandonment of use of the financial management system, according to one embodiment.

Figure 1:
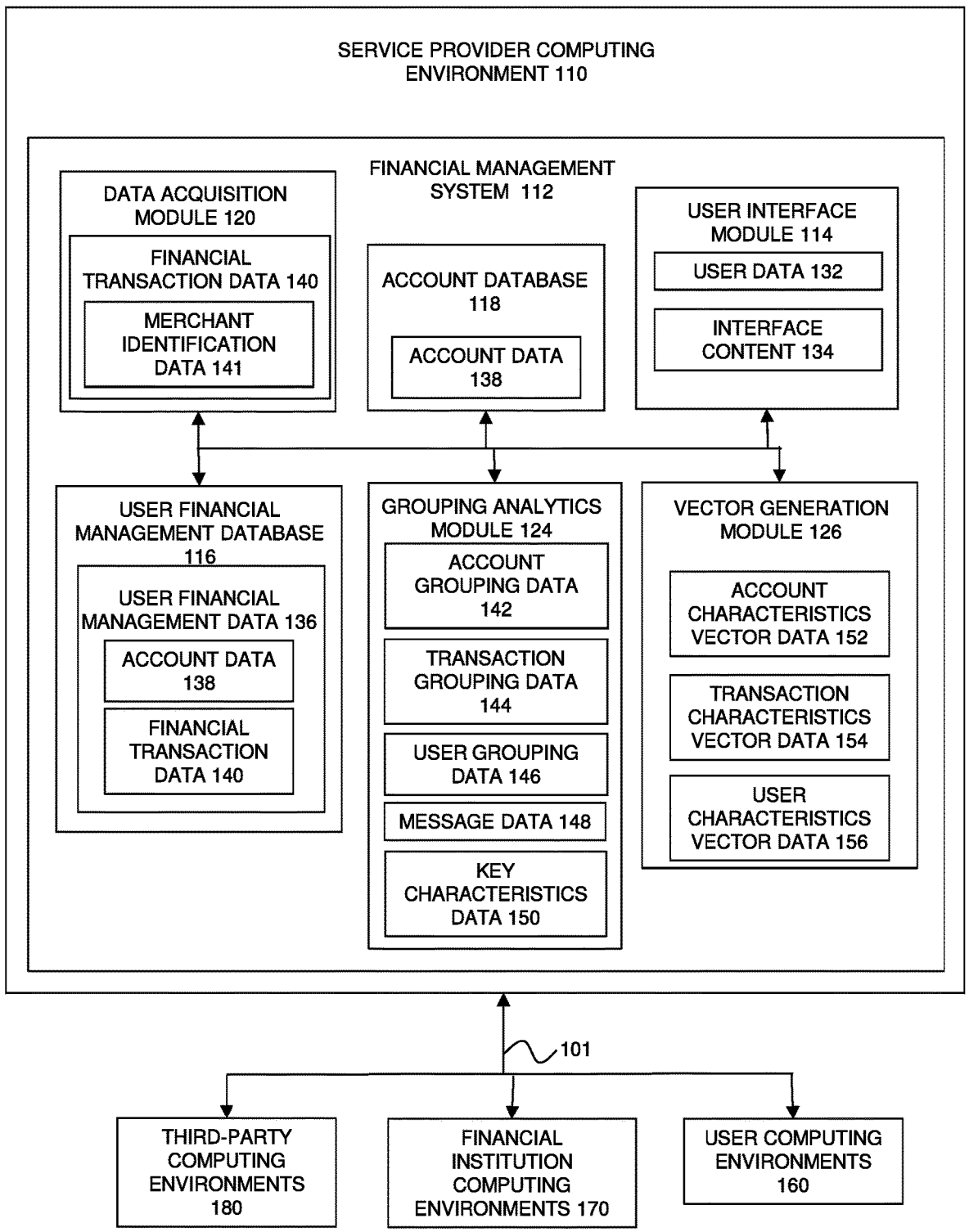
FIG. 1 is a block diagram of software architecture for assisting users to sort financial transactions into user accounts based on transaction grouping data, account grouping data, and user grouping data, in accordance with one embodiment.

Common reference numerals are used throughout the FIG.s and the detailed description to indicate like elements. One skilled in the art will readily recognize that the above FIG.s are examples and that other architectures, modes of operation, orders of operation, and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be implemented in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

Herein, the term "production environment" includes the various components, or assets, used to deploy, implement, access, and use, a given application as that application is intended to be used. In various embodiments, production environments include multiple assets that are combined, communicatively coupled, virtually and/or physically connected, and/or associated with one another, to provide the production environment implementing the application.

As specific illustrative examples, the assets making up a given production environment can include, but are not limited to, one or more computing environments used to implement the application in the production environment such as a data center, a cloud computing environment, a dedicated hosting environment, and/or one or more other computing environments in which one or more assets used by the application in the production environment are implemented; one or more computing systems or computing entities used to implement the application in the production environment; one or more virtual assets used to implement the application in the production environment; one or more supervisory or control systems, such as hypervisors, or other monitoring and management systems, used to monitor and control assets and/or components of the production environment; one or more communications channels for sending and receiving data used to implement the application in the production environment; one or more access control systems for limiting access to various components of the production environment, such as firewalls and gateways; one or more traffic and/or routing systems used to direct, control, and/or buffer, data traffic to components of the production environment, such as routers and switches; one or more communications endpoint proxy systems used to buffer, process, and/or direct data traffic, such as load balancers or buffers; one or more secure communication protocols and/or endpoints used to encrypt/decrypt data, such as Secure Sockets Layer (SSL) protocols, used to implement the application in the production environment; one or more databases used to store data in the production environment; one or more internal or external services used to implement the application in the production environment; one or more backend systems, such as backend servers or other hardware used to process data and implement the application in the production environment; one or more software systems used to implement the application in the production environment; and/or any other assets/components making up an actual production environment in which an application is deployed, implemented, accessed, and run, e.g., operated, as discussed herein, and/or as known in the art at the time of filing, and/or as developed after the time of filing.

As used herein, the terms "computing system", "computing device", and "computing entity", include, but are not limited to, a virtual asset; a server computing system; a workstation; a desktop computing system; a mobile computing system, including, but not limited to, smart phones, portable devices, and/or devices worn or carried by a user; a database system or storage cluster; a switching system; a router; any hardware system; any communications system; any form of proxy system; a gateway system; a firewall system; a load balancing system; or any device, subsystem, or mechanism that includes components that can execute all, or part, of any one of the processes and/or operations as described herein.

In addition, as used herein, the terms computing system and computing entity, can denote, but are not limited to, systems made up of multiple: virtual assets; server computing systems; workstations; desktop computing systems; mobile computing systems; database systems or storage clusters; switching systems; routers; hardware systems; communications systems; proxy systems; gateway systems; firewall systems; load balancing systems; or any devices that can be used to perform the processes and/or operations as described herein.

As used herein, the term "computing environment" includes, but is not limited to, a logical or physical grouping of connected or networked computing systems and/or virtual assets using the same infrastructure and systems such as, but not limited to, hardware systems, software systems, and networking/communications systems. Typically, computing environments are either known environments, e.g., "trusted" environments, or unknown, e.g., "untrusted" environments. Typically, trusted computing environments are those where the assets, infrastructure, communication and networking systems, and security systems associated with the computing systems and/or virtual assets making up the trusted computing environment, are either under the control of, or known to, a party.

In various embodiments, each computing environment includes allocated assets and virtual assets associated with, and controlled or used to create, and/or deploy, and/or operate an application.

In various embodiments, one or more cloud computing environments are used to create, and/or deploy, and/or operate an application that can be any form of cloud computing environment, such as, but not limited to, a public cloud; a private cloud; a virtual private network (VPN); a subnet; a Virtual Private Cloud (VPC); a sub-net or any security/communications grouping; or any other cloud-based infrastructure, sub-structure, or architecture, as discussed herein, and/or as known in the art at the time of filing, and/or as developed after the time of filing.

In many cases, a given application or service may utilize, and interface with, multiple cloud computing environments, such as multiple VPCs, in the course of being created, and/or deployed, and/or operated.

As used herein, the term "virtual asset" includes any virtualized entity or resource, and/or virtualized part of an actual, or "bare metal" entity. In various embodiments, the virtual assets can be, but are not limited to, virtual machines, virtual servers, and instances implemented in a cloud computing environment; databases associated with a cloud computing environment, and/or implemented in a cloud computing environment; services associated with, and/or delivered through, a cloud computing environment; communications systems used with, part of, or provided through, a cloud computing environment; and/or any other virtualized assets and/or sub-systems of "bare metal" physical devices such as mobile devices, remote sensors, laptops, desktops, point-of-sale devices, etc., located within a data center, within a cloud computing environment, and/or any other physical or logical location, as discussed herein, and/or as known/available in the art at the time of filing, and/or as developed/made available after the time of filing.

In various embodiments, any, or all, of the assets making up a given production environment discussed herein, and/or as known in the art at the time of filing, and/or as developed after the time of filing, can be implemented as one or more virtual assets.

In one embodiment, two or more assets, such as computing systems and/or virtual assets, and/or two or more computing environments, are connected by one or more communications channels including but not limited to, Secure Sockets Layer (SSL) communications channels and various other secure communications channels, and/or distributed computing system networks, such as, but not limited to: a public cloud; a private cloud; a virtual private network (VPN); a subnet; any general network, communications network, or general network/communications network system; a combination of different network types; a public network; a private network; a satellite network; a cable network; or any other network capable of allowing communication between two or more assets, computing systems, and/or virtual assets, as discussed herein, and/or available or known at the time of filing, and/or as developed after the time of filing.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, any general network, communications network, or general network/communications network system; a wireless network; a wired network; a wireless and wired combination network; a satellite network; a cable network; any combination of different network types; or any other system capable of allowing communication between two or more assets, virtual assets, and/or computing systems, whether available or known at the time of filing or as later developed.

As used herein, the term "user" includes, but is not limited to, any party, parties, entity, and/or entities using, or otherwise interacting with any of the methods or systems discussed herein. For instance, in various embodiments, a user can be, but is not limited to, a person, a commercial entity, an application, a service, and/or a computing system.

As used herein, the term "relationship(s)" includes, but is not limited to, a logical, mathematical, statistical, or other association between one set or group of information, data, and/or users and another set or group of information, data, and/or users, according to one embodiment. The logical, mathematical, statistical, or other association (i.e., relationship) between the sets or groups can have various ratios or correlation, such as, but not limited to, one-to-one, multiple-to-one, one-to-multiple, multiple-to-multiple, and the like, according to one embodiment. As a non-limiting example, if the disclosed financial management system determines a relationship between a first group of data and a second group of data, then a characteristic or subset of a first group of data can be related to, associated with, and/or correspond to one or more characteristics or subsets of the second group of data, or vice-versa, according to one embodiment. Therefore, relationships may represent one or more subsets of the second group of data that are associated with one or more subsets of the first group of data, according to one embodiment. In one embodiment, the relationship between two sets or groups of data includes, but is not limited to similarities, differences, and correlations between the sets or groups of data As used herein, the term "account" includes, but is not limited to, a grouping of transactions within an accounting system. For instance, in various embodiments, accounts can be hierarchical in that one account can contain the content of one or more other accounts. Apart for hierarchical nesting accounts may also be structured to be either mutually exclusive or not mutually exclusive such that if there is a containment relationship between two accounts the containment may either be complete or partial.

Hardware Architecture

FIG. 1 illustrates a block diagram of a production environment 100 for assisting users to sort financial transactions into accounts of users based on transaction grouping data, account grouping data, and user grouping data, according to one embodiment. Embodiments of the present disclosure provide methods and systems for assisting users to sort financial transactions into user accounts based on transaction grouping data, account grouping data, and user grouping data, according to one embodiment. The financial management system enables each user of the financial management system to create various accounts into which the user can sort financial transactions of the user as a tool for managing the user's finances and keeping track of financial expenditures and revenues. Embodiments of the present disclosure assist the user to sort the financial transactions into accounts of the user based on analysis of the financial transaction data related to financial transactions and accounts of a large number of users of the financial management system. In particular, the financial management system retains data related to the financial transactions of the users of the financial management system and the accounts of the users into which the financial transactions resorted. The financial management system generates grouping data that defines groups of accounts of the users based on the similarities in the financial transactions that were sorted into the accounts. The financial management system also generates transaction grouping data that defines groups of financial transactions based on the merchants that were party to the financial transactions. The groups of financial transactions can be considered groups of merchants that are grouped together based on how financial transactions involving those merchants were sorted into the groups of accounts. The financial management system generates user grouping data that identifies groups of similar users of the financial management system. The users are grouped based on how they sorted financial transactions associated with the groups of financial transactions into the groups of accounts. The financial management system utilizes these various grouping data in order to identify, for a current user of the financial management system, into which accounts of the current user the financial transactions of the current user should be grouped. If the user has a financial transaction with a merchant with whom the user has previously had a financial transaction, the financial management system can sort the financial transaction based at least in part on how the user sorted previous financial transactions with that merchant. If the user has a financial transaction with a merchant with whom the user has not previously had a financial transaction, the financial management system can assist the user in selecting an account of the user into which to sort the financial transaction. This is because the merchant involved in the financial transaction is associated with one of the groups of financial transactions or groups of merchants. Furthermore, the merchant involved in the financial transaction is associated with one or more of the groups of accounts. The financial management system can match the user to one of the groups of users, can identify a group of accounts associated with the group of users and the merchant involved in the financial transaction, and can identify one or more accounts of the user that are associated with the group of financial transactions or group of merchants. The financial management system can then assist the user in sorting the financial transaction into one of the accounts of the user that is included in the group of accounts. If needed, the financial management system can implement further analysis of the characteristics of the financial transaction in order to identify a single account of the user that is most probable to be the correct account into which to sort the financial transaction. The financial management system can recommend that the user sort the financial transaction into the account, or the financial management system can automatically sort the financial transaction into the account. In this way, the financial management system assists users in sorting financial transactions and enables the financial management system to provide improved data management services.

In addition, the disclosed method and system for assisting users to sort financial transactions into user accounts based on transaction grouping data, account grouping data, and user grouping data provides for significant improvements to the technical fields of electronic financial transaction data processing, data processing, data management, and user experience.

In addition, as discussed above, the disclosed method and system for assisting users to sort financial transactions into user accounts based on transaction grouping data, account grouping data, and user grouping data provide for the processing and storage of smaller amounts of data, i.e., more efficiently provide financial management services; thereby eliminating unnecessary data analysis and storage. Consequently, using the disclosed method and system for assisting users to sort financial transactions into user accounts based on transaction grouping data, account grouping data, and user grouping data results in more efficient use of human and non-human resources, fewer processor cycles being utilized, reduced memory utilization, and less communications bandwidth being utilized to relay data to, and from, backend systems and client systems, and various investigative systems and parties. As a result, computing systems are transformed into faster, more efficient, and more effective computing systems by implementing the method and system for assisting users to sort financial transactions into user accounts based on transaction grouping data, account grouping data, and user grouping data.

The production environment 100 includes a service provider computing environment 110, user computing environments 160, financial institution computing environments 170, and third-party computing environments 180, for assisting users to sort financial transactions into user accounts based on transaction grouping data, account grouping data, and user grouping data, according to one embodiment. The computing environments 110, 160, 170, and 180 are communicatively coupled to each other with one or more communication channels 101, according to one embodiment.

The service provider computing environment 110 represents one or more computing systems such as one or more servers and/or distribution centers that are configured to receive, execute, and host one or more financial management systems (e.g., applications) for access by one or more users, for assisting users to sort financial transactions into user accounts based on transaction grouping data, account grouping data, and user grouping data, according to one embodiment. The service provider computing environment 110 represents a traditional data center computing environment, a virtual asset computing environment (e.g., a cloud computing environment), or a hybrid between a traditional data center computing environment and a virtual asset computing environment, according to one embodiment.

The service provider computing environment 110 includes a financial management system 112, which is configured to provide financial management services to a plurality of users.

According to one embodiment, the financial management system 112 is an electronic financial accounting system that assists users in book-keeping or other financial accounting practices. Additionally, or alternatively, the financial management system can manage one or more of tax return preparation, banking, investments, loans, credit cards, real estate investments, retirement planning, bill pay, and budgeting. The financial management system 112 can be a standalone system that provides financial management services to users. Alternatively, the financial management system 112 can be integrated into other software or service products provided by a service provider.

In one embodiment, the financial management system 112 can assist users in tracking expenditures and revenues by retrieving financial transaction data related to financial transactions of users and by enabling the users to sort the financial transactions into accounts. Each user can have multiple accounts into which the user's financial transactions can be sorted. The financial management system 112 enables the users to generate and name their various accounts and to use the accounts for their own financial tracking purposes. Because the names and purposes of the accounts are user generated, the types of accounts, or the way the user uses the accounts, may not be properly discernible by the financial management system 112 based only on the names of the accounts. If the financial management system 112 does not know the type of each account, then the financial management system 112 may not be able to provide adequate financial management services or other data management services.

In one embodiment, the financial management system 112 improves the efficiency and effectiveness of financial management services and other data management services by grouping the accounts of the users into groups based on the similarities in the kinds of financial transactions sorted into the accounts, by grouping financial transactions based on the groups of accounts into which financial transactions associated with the merchant counter-parties have been sorted in the past by users of the financial management system 112, and by grouping users based on how they have sorted financial transactions associated with the groups of financial transactions into the groups of accounts. The financial management system 112 assists the user of the financial management system to sort a new financial transaction of the user into an account of the users by matching the user to one or more of the groups of users, by identifying groups of accounts associated with both the group of users and the group of transactions related to the new financial transaction, and identifying one or more accounts of the user included in the one or more groups of accounts associated with the group of transactions and the group of users. After identifying the one or more accounts of the user, the financial management system 112 can recommend that the user sort the financial transactions into one of the one or more identified accounts of the user. Alternatively, after the financial management system 112 has identified one or more candidate accounts of the user, the financial management system 112 can perform further analysis on the characteristics associated with the financial transaction in order to more definitively select one of the accounts of the user as the most probable account into which the user should sort the financial transaction. The financial management system 112 can also automatically sort the financial transaction into the candidate account if the financial management system 112 has identified a candidate account having a probability greater than a threshold probability of being the correct account into which the financial transaction should be sorted. In this way, the financial management system 112 can greatly reduce the amount of time users spend in sorting financial transactions into the various accounts of the users.

In one embodiment, the financial management system 112 includes a user interface module 114, a user financial management database 116, an account database 118, a data acquisition module 120, a grouping analytics module 124, and a vector generation module 126, according to one embodiment.

The user computing environments 160 correspond to computing environments of the various users of the financial management system 112. The users of the financial management system 112 utilize the user computing environments 160 to interact with the financial management system 112. The users of the financial management system 112 can use the user computing environments 160 to provide data to the financial management system 112 and to receive data, including financial management services, from the financial management system 112.

In one embodiment, the users of the financial management system can include companies, businesses, organizations, government entities, individuals, groups of individuals, or any other entities for which financial management services would be beneficial, according to one embodiment. Businesses of all kinds, including large corporations, mid-size companies, small businesses, or even sole proprietor businesses, can utilize the financial management system 112 to track and sort their financial transactions into various accounts as a way to better manage their finances. Likewise, government organizations may use the financial management system 112 to sort their financial transactions into accounts in order to track various types of expenditures and revenues. Organizations other than businesses and government entities, such as nonprofit organizations, may also utilize the financial management system 112 for the purpose of monitoring and sorting expenditures and revenues. Furthermore, individuals may utilize the financial management system 112 to track their own revenues and expenditures. Thus, the term "user" can refer to many types of entities.

Returning to the financial management system 112, the user interface module 114 is configured to receive user data 132 from the users, according to one embodiment. The user data 132 includes information, such as, but not limited to a name of a business, and address of a business, data related to individuals associated with the business, employee data, payroll data, authentication data that enables the user to access the financial management system, or any other types of data that a user may provide in working with the financial management system 112.

In one embodiment, the user data 132 can include financial institution authentication data that enables the financial management system 112 to access the financial accounts that the user has with third-party financial institutions or other third-parties. In one embodiment, the financial institution authentication data provided by the users as part of the user data 132 enables the financial management system 112 to acquire information related to financial transactions of the users. The financial institution authentication data can include data that allows the financial management system 112 to gain access to credit card data, bank account data, retirement fund data, payroll data, income data, loan data, interest accrual data, student loan data, property ownership data, tax data, budgeting data, rent data, investments data, employment data, or other types of data regarding financial transactions or financial accounts of the users. Thus, the financial institution authentication data can include login credentials and personal identification data for various websites of third-party financial institutions. The financial institution authentication data of user data 132 can include usernames, passwords, bank account numbers, routing numbers, credit card numbers, answers to security questions, identification numbers, government identification numbers, birth dates, addresses, or other types of verification credentials that allow the financial management system 112 to gain access to online services of third-party financial service institutions.

In one embodiment, the user data 132 can also include data provided by the users to create and name the various accounts that the users will use to sort and categorize financial transactions. These accounts can correspond to categories of revenues or expenses of the users into which financial transactions of the users can be sorted. The users can generate the accounts so that the financial management system 112 can assist the users in better managing their finances.

In one embodiment, because the users can name the accounts however they like, it can be difficult to determine how the users use the accounts or how the users intend to use the accounts. For example, two businesses that use the financial management system 112 may each have an account named "travel". The first business may utilize its "travel" account to track the traveling expenses of employees. These expenses may commonly include plane tickets, hotel charges, dinner expenses, taxi expenses, or other expenses commonly incurred when an individual travels for a meeting or conference. The second business may utilize its "travel" account primarily for expenses related to the maintenance of a fleet of company cars that sales people use as they travel about their respective regions making sales calls. Thus, the travel account of the second business may commonly include expenses such as gasoline, tire repair, monthly car payments, or new car purchases. Therefore, although the two accounts are similarly named, the types of expenses that are sorted into these accounts are quite different.

If a financial management system were to try to sort new financial transactions of these two users into these accounts based only on their names, it is likely that the financial management system 112 would not properly sort the expenses in accordance with the purposes of at least one of the two companies.

Additionally, two companies may include accounts that are nearly identical in purpose, but have entirely dissimilar names. For example, a first company may have an account titled stationary that includes expenses related to stocking office supplies such as paper, pens, printing ink, etc. A second company may have an account named simply with the initials PPI. The second company uses this account to track expenses related to the purchase of office supplies such as paper, pens, and ink for printers. Thus, even though the names of these two accounts are entirely dissimilar, they nevertheless are utilized for the same general purpose by the first and second companies.

If a financial management system were to try to sort expenses related to these accounts, it is possible that a financial management system would not properly sort financial transactions related to the account titled "stationary". However, it is unlikely that a financial management system will properly sort expenses related to the account titled PPI. Thus, relying merely on the name of an account in order to understand the purpose of the account can lead to many problems.

Furthermore, it can be beneficial for a financial management system or a data management system to understand the purposes of user generated accounts for purposes such as identifying companies with similar accounting practices or for other such purposes.

In one embodiment, the user interface module 114 provides interface content 134 to the user's computing environments 160. The interface content 134 can include data enabling a user to obtain the current status of the user's accounts. For example the interface content 134 can enable the user to select among the user's accounts in order to view financial transactions associated with the user's accounts. The interface content 134 can enable a user to view the overall state of many accounts. The interface content 134 can also enable a user to select among the various options in the financial management system in order to fully utilize the services of the financial management system. The user can provide user data 132 in conjunction with the interface content 134 in order to sort financial transactions of the user into the users accounts.

In one embodiment, the financial management system 112 includes a user financial management database 116. The user financial management database 116 includes the user financial management data 136. The user financial management data 136 can include data indicating the current status of all of the accounts of all of the users of the financial management system. Thus, the user financial management database 116 can include a vast amount of data related to the financial management services provided to users. In one embodiment, when the user utilizes the interface module 114 to view interface content 134, the interface content 134 includes user financial management data 136 retrieved from the user financial management database 116.

In one embodiment, the user financial management data 136 includes account data 138 and financial transaction data 140. The user financial management data 136 can include, for each account of each user, a list of the financial transactions associated with the account. Thus, the user financial management data 136 can include a large number of accounts and a large number of financial transactions that have been sorted into each account.

In one embodiment, each financial transaction in the user financial management data 136 includes merchant identification data that identifies the merchant or vendor involved in the financial transaction. In one example, a particular user has an account for expenses related to food provided to employees during lunch meetings, for special occasions, for office parties, etc. The merchant identification data for these financial transactions may identify various restaurants, bakeries, grocery stores, and caterers. These restaurants, bakeries, grocery stores, and caterers are the merchants or vendors associated with the financial transactions associated with that account.

In one embodiment, the financial management system 112 includes an account database 118. The account database 118 includes account data 138. The account data 138 can include a list of accounts of all the users and some or all of their properties. The account database 118 can be a database separate from the user financial management database 116. Alternatively, the account database 118 can be a part of the user financial management data 136.

In one embodiment, the data acquisition module 120 is configured to use the financial institution authentication data provided in the user data 132 to acquire financial transaction data 140 related to financial transactions of the users from the financial institution computing environments 170. In particular, the data acquisition module 120 uses the financial institution authentication data to log into the online services of third-party financial institutions in order to retrieve financial transaction data 140 related to the financial transactions of users of the financial management system 112. The data acquisition module 120 accesses the financial institutions by interfacing with the financial institution computing environments 170. The financial transaction data 140 can include bank account deposits, bank account withdrawals, credit card transactions, credit card balances, credit card payment transactions, online payment service transactions such as PayPal transactions or other online payment service transactions, loan payment transactions, investment account transactions, retirement account transactions, mortgage payment transactions, rent payment transactions, bill pay transactions, budgeting information, or any other types of financial transactions. The data acquisition module 120 is configured to gather the financial transaction data 140 from financial institution computing environments 170 related to financial service institutions with which one or more users of the financial management system 112 have a relationship.

In one example, the data acquisition module 120 uses the financial institution authentication data to acquire data related to withdrawals, deposits, and balances in the bank accounts of users. The financial transaction data 140 includes data related to these withdrawals, deposits, and balances. Accordingly, the financial institution authentication data of user data 132 can include usernames, passwords, bank account numbers, routing numbers, or other validation credentials needed to access online services of various banking institutions.

In one embodiment, the financial transaction data 140 includes merchant identification data 141. Each financial transaction received in the financial transaction data 140 can include a merchant identification indicated by the merchant identification data 141. The financial management system 112 can use the merchant identification data 141 to assist the users in sorting their financial transactions into the various accounts of the users.

In one embodiment, the merchant identification data 141 includes a merchant string. The merchant string can include a data string associated with a credit card transaction, a bank transaction, a checking account transaction, an online payment transaction, or other kinds of financial transactions. The merchant string for a given financial transaction may include a name of the merchant involved in the financial transaction, a part of the name of the merchant, a code associated with the merchant, an address associated with the merchant, or other types of data that can potentially identify the merchant.

In one embodiment, the data acquisition module 120 is configured to acquire data from third-party computing environments 180. The data acquisition module 120 can request and receive data from the third-party computing environments 180 to supply or supplement the financial transaction data 140, according to one embodiment. In one embodiment, the third-party computing environments 180 automatically transmit financial data to the financial management system 112 (e.g., to the data acquisition module 120), to be merged into the financial transaction data 140. The third-party computing environment 180 can include, but is not limited to, financial service providers, state institutions, federal institutions, private employers, financial institutions, social media, and any other business, organization, or association that has maintained financial data, that currently maintains financial data, or which may in the future maintain financial data, according to one embodiment.

In one embodiment, the financial management system 112 can keep a list of the financial transactions and their associated merchant identification data 141 so that users can access the user financial management data 136 and see a list of financial transactions to be sorted into the accounts of the users. The users can then sort the financial transactions into the accounts. Alternatively, the data acquisition module 120 can automatically sort some of the financial transactions into the accounts of the users. However, as described previously, it can be difficult to sort financial transactions into the accounts when the nature of the accounts is not fully understood by the financial management system 112, and when the user has not previously had financial transactions with a particular merchant.

According to one embodiment, in order to assist users in sorting financial transactions, the financial management system 112 groups the accounts of the users into groups of similar accounts, groups the merchants associated with financial transactions into groups of similar merchants, and groups the users themselves into groups of similar users. This can assist the financial management system in many ways. In one embodiment, grouping the accounts, merchants, and users can assist the financial management system 112 in automatically sorting the financial transactions associated with the financial transaction data 140 into the correct accounts. In one embodiment, grouping the accounts can assist the financial management system 112 in understanding which businesses or organizations have similar accounting practices. Many other benefits can result from having a more complete understanding of the nature and purposes of the user accounts.

In one embodiment, the financial management system 112 generates account grouping data 142. The account grouping data 142 can identify groups or clusters of accounts. The accounts are grouped based on the similarities in the financial transactions associated with the accounts. In particular, the accounts are grouped based on the merchants involved in the financial transactions sorted into the accounts. After the groups of accounts are formed, the financial management system 112 can use the account grouping data 142 to improve the efficiency and effectiveness of the financial management system 112.

In one embodiment, the financial management system 112 generates transaction grouping data 144. The transaction grouping data 144 can identify groups or clusters of financial transactions. The financial transactions are grouped based on the similarities in the accounts or groups of accounts into which financial transactions associated have been sorted, based on the merchants involved in the financial transactions, or based on other characteristics of the financial transactions. After the groups of financial transactions are formed, the financial management system 112 can use the transaction grouping data 144 to improve the efficiency and effectiveness of the financial management system 112.

In one embodiment, the financial management system 112 generates user grouping data 146. The user grouping data 146 can identify groups or clusters of users. The users are grouped based on the types of accounts they have and the way that they sort financial transactions into those accounts. The users can be grouped based on the various groups of accounts into which the accounts of the users are disbursed. Users that have accounts in many of the same groups of accounts are similar to each other. Thus, the users can be grouped based on the groups of accounts with which they are associated, which is in turn based on the way that the users sort financial transactions into their accounts. After the groups of users are formed, the financial management system 112 can use the user grouping data 146 to improve the efficiency and effectiveness of the financial management system 112.

In one embodiment, the financial management system 112 can utilize the vector generation module 126 in the grouping process for accounts, users, and merchants. In particular, the vector generation module 126 can generate account characteristics vector data 152 including account characteristics vectors that each represent a respective account of one of the users. The vector generation module 126 can also generate transaction characteristics vector data 154 including transaction characteristics vectors that each represent a respective merchant, merchant string, or merchant identifier associated with financial transactions. The vector generation module 126 can also generate user characteristics vector data 156 including user characteristics vectors that each represent a respective user of the financial management system 112. The grouping analytics module 124 can analyze the account characteristics vector data 152, the transaction characteristics vector data 154, and the user characteristics vector data 156 in order to generate the account grouping data 142, the transaction grouping data 144, and the user grouping data 146.

In one embodiment, the account characteristics vector data 152 includes, for each account in the account data 138, a respective account characteristics vector. Thus, in one embodiment the vector generation module 126 generates one account characteristics vector for each account. If the financial management system 112 includes millions of users each having multiple accounts, then the account characteristics vector data 152 can include many millions of account characteristics vectors. These account characteristics vectors can be used in the grouping process, according to one embodiment.

In one embodiment, each account characteristics vector in the account characteristics vector data 152 includes a plurality of data fields. In one embodiment, each data field corresponds to a respective merchant or merchant identification. Each data field includes a respective data value. The data value is an indication of a number, frequency, or rate of financial transactions from that account that involve the merchant associated with that data field. Thus, in one embodiment, a higher data value indicates a higher number, proportion, or rate of occurrence of financial transactions involving the merchant and assigned to that account. A data value of zero can indicate that either no financial transactions have occurred with that merchant and that account, or that a statistically insignificant number of financial transactions have occurred with that merchant and that account.

In one embodiment, because some businesses or organizations may be much larger than other businesses or organizations, the sheer number of financial transactions for those businesses or organizations may be much higher than the number of financial transactions for other businesses or organizations that are smaller. Thus, merely listing, as a data value for a data field of an account characteristics vector, the number of transactions that involve a particular merchant may not be as meaningful when trying to find similar accounts associated with different users. Accordingly, in one embodiment, the data values in the respective data fields of an account characteristics vector can be normalized data values. For example, the data values can be normalized such that each data value represents a proportion of the total number of financial transactions. In one embodiment, the data values can be weighted. In one embodiment, the data values can represent a simple percentage of the total number of financial transactions that involve that merchant. These ways of generating data values for the various data fields of the account characteristics vectors can be more useful when utilizing the account characteristics vectors to determine which accounts are similar to each other as far as accounting purposes are concerned, as will be set forth in more detail below.

In one embodiment, the vector generation module 126 generates the data values for the data fields of the account characteristics vectors using a term frequency inverse document frequency (TF-IDF) process. In the TF-IDF process for generating a single data value in a single data field of a single account characteristics vector, the vector generation module 126 counts the fraction of financial transactions that are assigned to that account and involve the merchant associated with the data field. The vector generation module 126 then counts the total number of accounts that include a financial transaction involving the relevant merchant. The vector generation module 126 then generates the data value by multiplying the fraction of financial transactions involving the merchant from the account by the logarithm of the inverse of the total fraction of accounts that include a financial transaction with the merchant that corresponds to the data field for which the data value is being computed. The vector generation module 126 can generate data values for each data field of the account characteristics vector using the TF-IDF process. The vector generation module 126 can generate an account characteristics vector for each account in the account database 118.

In one embodiment, the account characteristics vector generation module 126 can generate the data values for the data fields of the account characteristics vectors by taking the logarithm of the result of the TF-IDF process. Thus, the data value in a given data field of a given account vector can correspond to the logarithm of a number generated by the TF-IDF process. In one embodiment, the vector generation module 126 uses a base 2 logarithm for the calculation. Alternatively, the vector generation module 126 can use a logarithm with a base other than 2.

In one embodiment, each data field of an account characteristics vector can correspond to a group of merchants or merchant identifications. For example, rather than having a data field for each merchant gas station, a single data field can correspond to multiple gas stations. Each gas station may have its own merchant identification. Thus, a single data field may correspond to multiple merchant identifications for the various gas stations in the group. Thus, when generating a data value for the data field, the number of financial transactions for each of the gas stations in the group can be summed together to provide a data value. This sum can then be weighted, averaged, normalized, passed through a TF-IDF process, or otherwise processed to generate the data value for the data field.

In one embodiment, the grouping analytics module 124 analyzes the account characteristics vector data 152 in order to generate the account grouping data 142 identifying groups of similar accounts. In particular, the grouping analytics module 124 can process the account characteristics vector data 152 including all of the account characteristics vectors in order to find groups of similar account characteristics vectors. The groups of account characteristics vectors correspond to groups of accounts associated with those account characteristics vectors. Thus, the grouping analytics module 124 can find groups of similar accounts by finding groups of similar account characteristics vectors.

In one embodiment, the grouping analytics module 124 generates the account grouping data 142 by applying one or more clustering algorithms to the account characteristics vectors data. In particular, the grouping analytics module 124 can apply the one or more clustering algorithms to the account characteristics vectors represented by the account characteristics vectors data 152. The clustering algorithms can identify account characteristics vectors that are similar to each other. The clustering algorithms can determine how similar or dissimilar two account characteristics vectors are based on the similarities between the data values in the data fields.

In one embodiment, similar account characteristics vectors will include vectors that have similar data values in many of their data fields. Accounts that are used by different users for similar purposes will have financial transactions with some or many of the same or similar merchants. Likewise, there will be vast numbers of merchants or categories of merchants for which the similar accounts have no financial transactions. Two similar accounts will likely not have financial transactions with all the same merchants, but they will have financial transactions with some of the same merchants or similar kinds of merchants.

In one embodiment, the grouping analytics module 124 generates the account grouping data 142 by applying one or more clustering algorithms to the account characteristics vector data 152 to generate the account grouping data 142. In one embodiment, the clustering algorithms can include a K means algorithm. In one embodiment, the clustering algorithms can include a density-based spatial clustering of applications with noise (DBSCAN) clustering algorithm. In one embodiment, the clustering algorithms can include an affinity propagation algorithm. The grouping analytics module 124 can use one or more of these clustering algorithms or other clustering algorithms in generating the account grouping data 142. In one embodiment, the grouping analytics module 124 can use different types of algorithms to generate the account grouping data 142.

In one embodiment, the vector generation module 126 generates transaction characteristics vector data 154 in a similar manner as the account characteristics vector data 152. In one embodiment, the transaction characteristics vector data 154 includes, for each merchant or merchant string known to the financial management system 112, a respective transaction characteristics vector. Thus, in one embodiment the vector generation module 126 generates one transaction characteristics vector for each merchant or merchant string. These transaction characteristics vectors can be used in the grouping process, according to one embodiment.

In one embodiment, each transaction characteristics vector in the transaction characteristics vector data 154 includes a plurality of data fields. In one embodiment, each data field corresponds to a respective account or group of accounts. Each data field includes a respective data value. The data value is an indication of a number, frequency, or rate of financial transactions involving that merchant or merchant string that have been sorted to the account or group of accounts corresponding to the data field. Thus, in one embodiment, a higher data value indicates a higher number, proportion, or rate of occurrence of financial transactions involving the merchant and assigned to the account or group of accounts associated with the data field. A data value of zero can indicate that either no financial transactions involving the merchant have been sorted to that account or group of accounts, or that a statistically insignificant number of financial transactions involving the merchant or merchant string have been sorted into the account or group of accounts corresponding to the data field.

In one embodiment, the grouping analytics module 124 generates the transaction grouping data 144 based on an analysis of the transaction characteristics vector data 154. In particular, the grouping analytics module 124 can generate the transaction grouping data 144 by utilizing algorithms, processes, and techniques similar to those set forth above in relation to generating the account grouping data 142, except that they are performed on the transaction characteristics vector data 154. Additionally, or alternatively, the grouping analytics module 124 can generate the transaction grouping data 144 in ways other than those described above in relation to generation of the account grouping data 142. The grouping analytics module 124 generates the transaction grouping data 144 identifying similar groups of financial transactions. The groups of financial transactions can correspond to groups of merchants or merchant strings based on the accounts or groups of accounts financial transactions involving those merchants or merchant strings into which the financial transactions are sorted.

In one embodiment, the vector generation module 126 generates transaction characteristics vector data 154 in a similar manner as the account characteristics vector data 152. In one embodiment, the transaction characteristics vector data 154 includes, for each merchant or merchant string known to the financial management system 112, a respective transaction characteristics vector. Thus, in one embodiment the vector generation module 126 generates one transaction characteristics vector for each merchant or merchant string. These transaction characteristics vectors can be used in the grouping process, according to one embodiment.

In one embodiment, each user characteristics vector in the user characteristics vector data 154 includes a plurality of data fields. In one embodiment, each data field corresponds to a respective account or group of accounts from the account data 138 associated with the various users. Each data field includes a respective data value. The data value is an indication of whether the user has an account included in the group of accounts corresponding to the data field. Additionally, or alternatively, the data value can be an indication of how frequently the user sorts financial transactions into an account associated with that group of accounts associated with the data field.

In one embodiment, the grouping analytics module 124 generates the user grouping data 146 based on an analysis of the user characteristics vector data 156. In particular, the grouping analytics module 124 can generate the user grouping data 146 by utilizing algorithms, processes, and techniques similar to those set forth above in relation to generating the account grouping data 142, except that they are performed on the user characteristics vector data 156. Additionally, or alternatively, the grouping analytics module 124 can generate the user grouping data 146 in ways other than those described above in relation to generation of the account grouping data 142. The grouping analytics module 124 generates the user grouping data 146 identifying similar groups of users based on the groups of accounts to which the users' accounts belong. The groups to which the users' accounts belong is in turn based on the way the users sort financial transactions into those accounts. Thus, the user groups are formed based on the accounts users have and the way they have sorted financial transactions into those accounts.

In one embodiment, the grouping analytics module 124 analyzes the account grouping data 142, the transaction grouping data 144, and the user grouping data 146 in order to assist the users in sorting new financial transactions into the correct accounts of users. In particular, when the financial management system 112 receives financial transaction data 140 representing a new financial transaction of one of the users, the grouping analytics module 124 identifies the merchant or merchant string associated with the financial transactions and assigns the new financial transaction to one or more groups of financial transactions and one or more groups of accounts. The grouping analytics module 124 also identifies a group of users from the user grouping data 146 to which the user belongs. The grouping analytics module can identify groups of accounts associated with the group of users. The grouping analytics module 124 can identify groups of accounts from the user accounts that are associated with the group or groups of financial transactions to which the financial transaction is assigned. The grouping analytics module 124 can then identify accounts of the user that belong to the groups of accounts associated with the group of users to which the user belongs and the group of financial transactions to which the financial transaction belongs. In this way, the grouping analytics module 124 can identify accounts of the user that are likely candidates for being the correct account into which the financial transaction should be sorted.

In one embodiment, at this stage the grouping analytics module 124 may have identified a single candidate account, two or three candidate accounts, or more than three candidate accounts to which the financial transaction could be sorted. The grouping analytics module 124 can proceed in several ways. The grouping analytics module 124 can decide that further analysis is needed to identify the most likely candidates account into which the financial transaction should be sorted. The grouping analytics module 124 can determine that a small number of candidate accounts have been identified and that the user can now sort the financial transaction into the proper account. The grouping analytics module 124 can determine that a single candidate account has been identified having a greater than threshold probability of being correct and that the user should now be presented with the candidate account so that the user can sort the financial transaction into the candidate account, or that the analytics module 126 automatically sort the financial transaction into the candidate account.

In one embodiment, the grouping analytics module 124 generates message data 148 and the user interface module 114 presents the message data 148 to the user via the interface content 134. The message data 148 can include text, graphics, or sound indicating to the user that one or more candidate accounts has been identified in that the user should now sort the financial transaction into one of these candidate accounts. The message data 148 can present to the user the candidate accounts in order of greatest probability of being the correct candidate account as identified by the grouping analytics module 124. The user can then and the financial management system 112 will sort the financial transaction into the account selected by the user. Alternatively, the message data 148 can identify single candidate account and can prompt the user to select or approve the sorting of the financial transaction into that account. Alternatively, the message data 148 can inform the user that the financial management system 112 has sorted the financial transaction into a particular account. The message data 148 can include an opportunity for the user to approve or undo the sorting of the financial transactions into the account. Thus, the grouping analytics module 124 generates message data that either assist the user to sort a financial transaction into an account, or informs the user that the financial transaction has been sorted into an account.

In one embodiment, as set forth above, there are instances in which after the grouping analytics module 124 has identified multiple candidate the accounts based on the account grouping data 142, the transaction grouping data 144, and the user grouping data 146, in which no account or accounts of the user have been identified as being the most likely accounts to which the financial transaction should be sorted. In this case, the grouping analytics module 124 performs additional analysis to identify one or more candidate accounts. In particular, the grouping analytics module 124 can further analyze the financial transaction data related to the financial transaction in order to identify further characteristics of the financial transaction beyond merely the merchant or merchant string associated with the financial transaction. The grouping analytics module 124 can identify from the financial transaction data, financial transaction description data that describes characteristics of the financial transaction. In addition to a merchant identification or merchant string, the financial transaction description data can include monetary value of the financial transaction, a business category code, financial account, a day of the week that the financial transaction occurred, a time of day that the financial transaction occurred, a geolocation associated with the financial transaction cluster, or other characteristics associated with the financial transaction. The grouping analytics module 124 can consider each of these characteristics of the financial transaction, as well as the group of financial transactions (or group of merchants) merchants and group of accounts assigned to the financial transaction, and can identify an account of the user that is most likely to be the correct account into which the financial transaction should be sorted based on these characteristics.

In one embodiment, the grouping analytics module 124 can assign weights to the various characteristics of the financial transaction. The grouping analytics module 124 can identify how strongly the various characteristics predict inclusion in the various groups of accounts. Analyzing the financial transaction and the accounts of the user based on these weighted characteristics can enable the grouping analytics module 124 to identify with more certainty a single account of the user into which the financial transaction should be sorted, or a small number of accounts that are most likely candidates for sorting the financial transaction. The grouping analytics module 124 can automatically sort the financial transaction or can request that the user sort the financial transaction into one of the accounts of the user that were identified based on analyzing the characteristics of the financial transaction.

In one embodiment, the grouping analytics module 124 can learn or identify weights for the various characteristics of financial transactions by minimizing prediction loss over a separate cross validation set of transactions using methods of gradient descent and regularization.

In one embodiment, as part of the weighting process, the grouping analytics module 124 can generate key characteristics data 150 for the various groups of accounts. The grouping analytics module 124 can generate the key characteristics data 150 by analyzing the account grouping data 142 in order to identify key characteristics of the accounts in each group. The key characteristics can correspond to characteristics that most strongly correlate with inclusion in the group. Based on these key characteristics, the grouping analytics module 124 can further refine the account grouping data 142 to make the account grouping data 142 more accurate. Additionally, or alternatively, the grouping analytics module 124 can use the key characteristics data 150 in order to sort new accounts generated by users of the financial management system 112.

In one embodiment, the key characteristics that correlate with inclusion in a group can correspond to particular merchants, groups of merchants, types of merchants with whom the accounts in the group include financial transactions. The key characteristics data 150 can also include monetary values of the financial transactions, business category codes, financial accounts, date or time of the transactions, geolocation associated with the financial transactions, or other characteristics associated with the financial transactions. These key characteristics can be the characteristics of a financial transaction that most strongly predict assignment of a financial transaction to the group of accounts.

In one embodiment, it is possible that a user of the financial management system 112 may have, in the chart of accounts of the user, empty accounts that hold no financial transactions at all. Accounts of transaction features, including merchant group and account group would be zero and therefore it would be difficult to match financial transactions to these accounts. The financial management system 112 can use the use the names of the empty accounts and other known attributes of the empty accounts to assign the empty accounts to an account group from the grouping data by similarity of the attributes of the accounts found in the groups of accounts. Once the empty accounts have been matched to groups of accounts from the account grouping data, the financial management system can include the empty accounts in the transaction sorting process. The financial management system can assign a new financial transaction to an empty account that is matched to a group of accounts associated with the new financial transaction when no other account in the chart of accounts of the user matches the features of the new financial transaction.

In one embodiment, the financial management system 112 continuously or periodically updates the account grouping data 142, the transaction grouping data 144, and the user grouping data 146. Over time, new users utilize the services of the financial management system. These new users generate new accounts and sort their financial transactions into these accounts. Furthermore, existing users of the financial management system create new accounts, revise old accounts, continue to sort financial transactions, and otherwise generate new data in relation to the account data 138 and financial transaction data 140. Thus, the financial management system 112 updates the account grouping data 142, the transaction grouping data 144, and the user grouping data 146 based on the new account data financial transaction data associated with new and existing users of the financial management system 112.

Process

Figure 2:
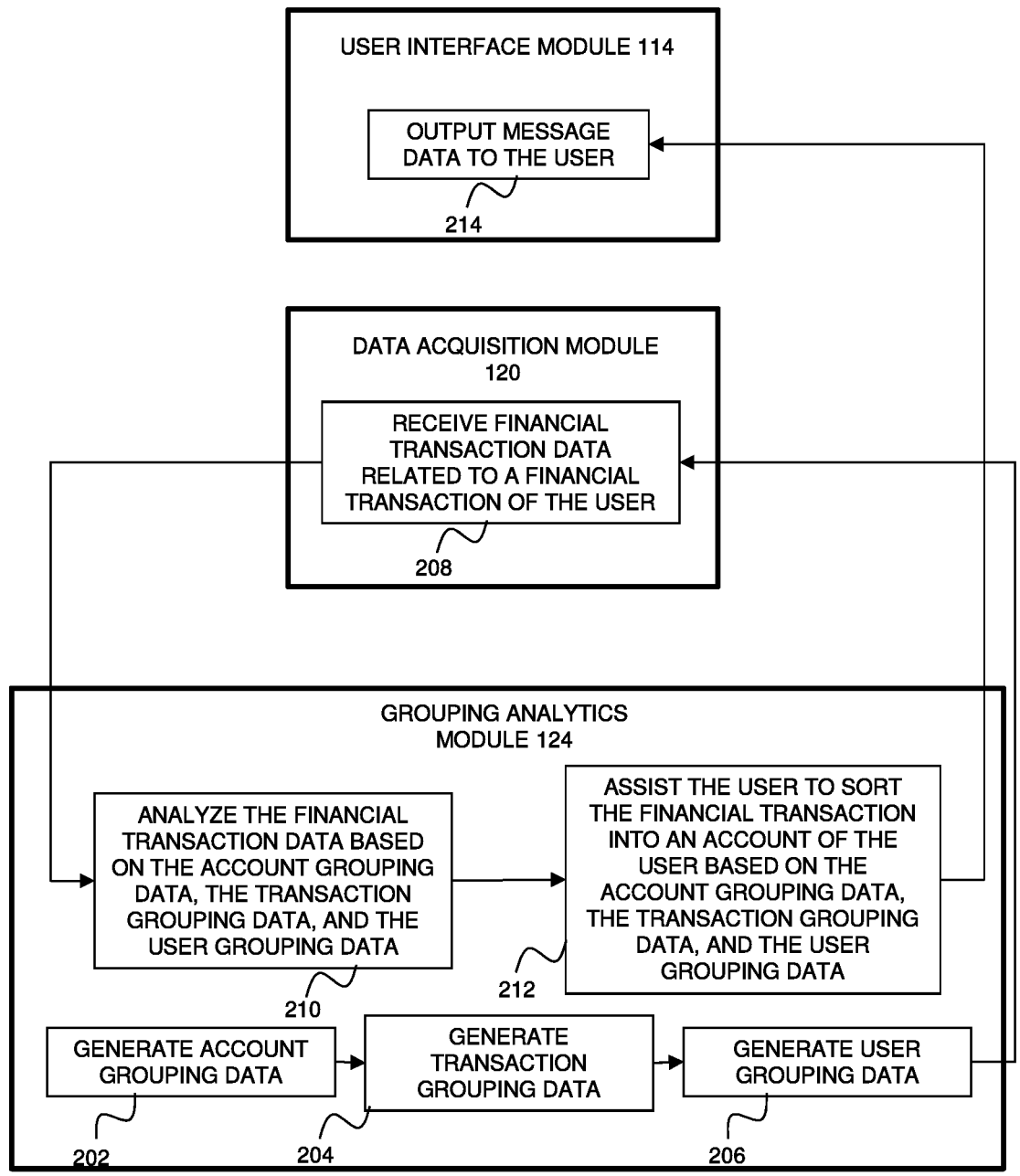
FIG. 2 is a block diagram of a process for assisting users to sort financial transactions into user accounts based on transaction grouping data, account grouping data, and user grouping data, in accordance with one embodiment.

FIG. 2 illustrates a functional flow diagram of a process 200 for assisting users to sort financial transactions into user accounts based on transaction grouping data, account grouping data, and user grouping data, in accordance with one embodiment.

Referring to FIGS. 1 and 2 together, at block 202 the grouping analytics module 124 generates account grouping data, according to one embodiment. From block 202 the process proceeds to block 204.

At block 204 the grouping analytics module 124 generates transaction grouping data, according to one embodiment. From block 204 the process proceeds to block 206.

At block 206 the grouping analytics module 124 generates user grouping data, according to one embodiment. From block 206 the process proceeds to block 208.

At block 208 the data acquisition module 120 receives financial transaction data related to a financial transaction of the user, according to one embodiment. From block 208 the process proceeds to block 210.

At block 210 the grouping analytics module 124 analyzes the financial transaction data based on the account grouping data, the transaction grouping data, and the user grouping data, according to one embodiment.

At block 212 the grouping analytics module 124 assists the user to sort the financial transaction into an account of the user based on the account grouping data, the transaction grouping data, and the user grouping data, according to one embodiment. From block 212 the process proceeds to block 214. The grouping analytics module 124 can assist the users to sort the financial transaction by identifying one or more candidate the accounts of the user into which the user can sort the financial transaction. Alternatively, the grouping analytics module 124 can assist the user to sort the financial transaction into an account of the user by automatically sorting the financial transaction into one of the accounts of the user. The grouping analytics module 124 can generate message data including a message to the user regarding the sorting of the financial transaction. From block 210 the process proceeds to block 212.

At block 214 the user interface module 114 outputs message data to the user, according to one embodiment. The message data can include a prompt for the user to select an account into which to sort the financial transaction. Alternatively, the message data can include an indication to the user that the financial management system has sorted the financial transaction into one of the accounts.

Although a particular sequence is described herein for the execution of the process 200, other sequences can also be implemented.

Figure 3:
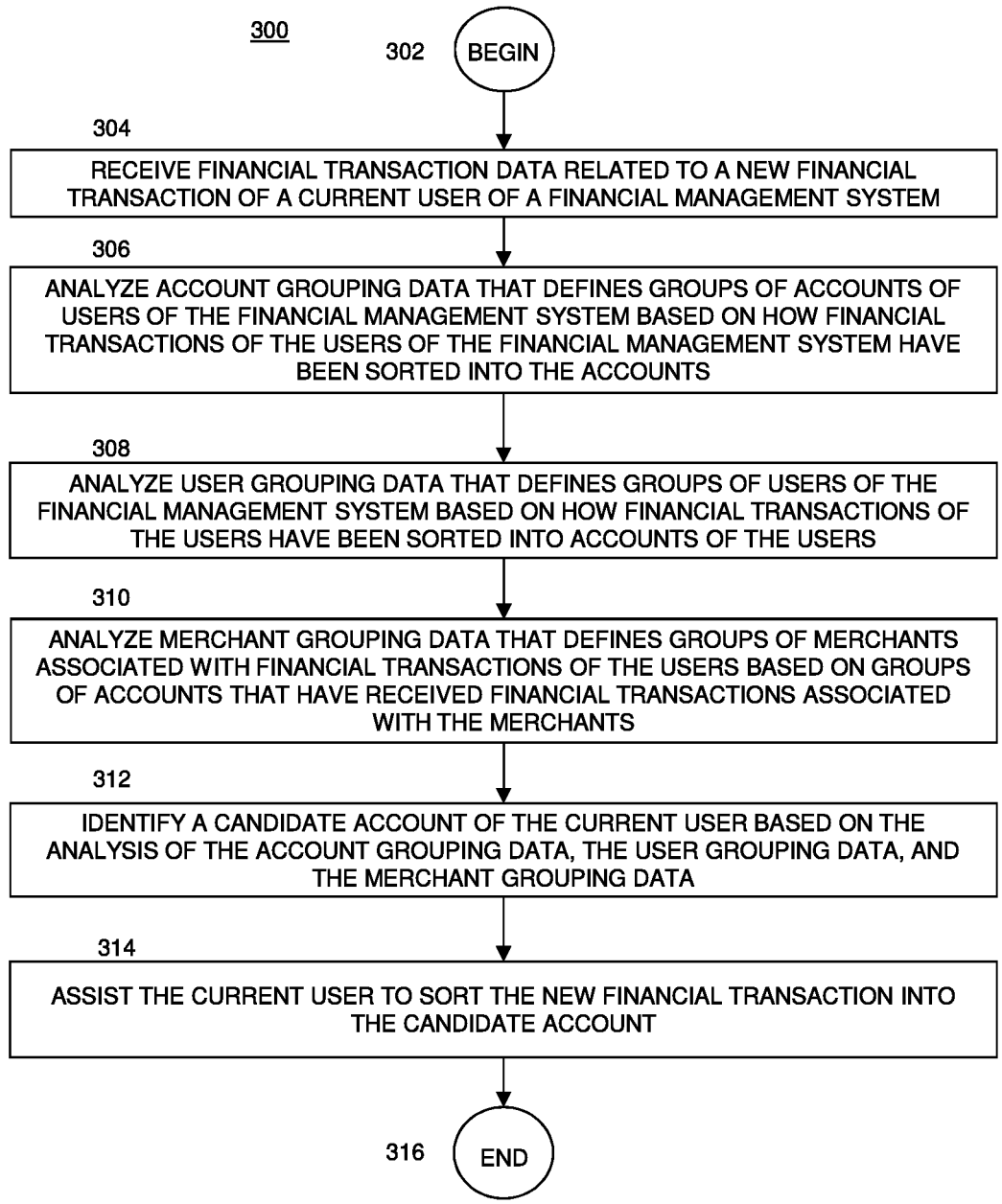
FIG. 3 is a flow diagram of a process for assisting users to sort financial transactions into user accounts based on transaction grouping data, account grouping data, and user grouping data, in accordance with one embodiment.

FIG. 3 illustrates a flow diagram of a process 300 for assisting users to sort financial transactions into user accounts based on transaction grouping data, account grouping data, and user grouping data, according to various embodiments.

In one embodiment, process 300 for assisting users to sort financial transactions into user accounts based on transaction grouping data, account grouping data, and user grouping data begins at BEGIN 302 and process flow proceeds to RECEIVE FINANCIAL TRANSACTION DATA RELATED TO A NEW FINANCIAL TRANSACTION OF A CURRENT USER OF A FINANCIAL MANAGEMENT SYSTEM 304.

In one embodiment, at RECEIVE FINANCIAL TRANSACTION DATA RELATED TO A NEW FINANCIAL TRANSACTION OF A CURRENT USER OF A FINANCIAL MANAGEMENT SYSTEM 304 process 300 for assisting users to sort financial transactions into user accounts based on transaction grouping data, account grouping data, and user grouping data receives financial transaction data related to a new financial transaction of a current user of a financial management system.

In one embodiment, once process 300 for assisting users to sort financial transactions into user accounts based on transaction grouping data, account grouping data, and user grouping data receives financial transaction data related to a new financial transaction of a current user of a financial management system at RECEIVE FINANCIAL TRANSACTION DATA RELATED TO A NEW FINANCIAL TRANSACTION OF A CURRENT USER OF A FINANCIAL MANAGEMENT SYSTEM 304 process flow proceeds to ANALYZE ACCOUNT GROUPING DATA THAT DEFINES GROUPS OF ACCOUNTS OF USERS OF THE FINANCIAL MANAGEMENT SYSTEM BASED ON HOW FINANCIAL TRANSACTIONS OF THE USERS OF THE FINANCIAL MANAGEMENT SYSTEM HAVE BEEN SORTED INTO THE ACCOUNTS 306.

In one embodiment, at ANALYZE ACCOUNT GROUPING DATA THAT DEFINES GROUPS OF ACCOUNTS OF USERS OF THE FINANCIAL MANAGEMENT SYSTEM BASED ON HOW FINANCIAL TRANSACTIONS OF THE USERS OF THE FINANCIAL MANAGEMENT SYSTEM HAVE BEEN SORTED INTO THE ACCOUNTS 306, process 300 for assisting users to sort financial transactions into user accounts based on transaction grouping data, account grouping data, and user grouping data analyzes account grouping data that defines groups of accounts of users of the financial management system based on how financial transactions of the users of the financial management system have been sorted into the accounts.

In one embodiment, once process 300 for assisting users to sort financial transactions into user accounts based on transaction grouping data, account grouping data, and user grouping data analyzes account grouping data that defines groups of accounts of users of the financial management system based on how financial transactions of the users of the financial management system have been sorted into the accounts at ANALYZE ACCOUNT GROUPING DATA THAT DEFINES GROUPS OF ACCOUNTS OF USERS OF THE FINANCIAL MANAGEMENT SYSTEM BASED ON HOW FINANCIAL TRANSACTIONS OF THE USERS OF THE FINANCIAL MANAGEMENT SYSTEM HAVE BEEN SORTED INTO THE ACCOUNTS 306, process flow proceeds to ANALYZE USER GROUPING DATA THAT DEFINES GROUPS OF USERS OF THE FINANCIAL MANAGEMENT SYSTEM BASED ON HOW FINANCIAL TRANSACTIONS OF THE USERS HAVE BEEN SORTED INTO ACCOUNTS OF THE USERS 308.

In one embodiment, at ANALYZE USER GROUPING DATA THAT DEFINES GROUPS OF USERS OF THE FINANCIAL MANAGEMENT SYSTEM BASED ON HOW FINANCIAL TRANSACTIONS OF THE USERS HAVE BEEN SORTED INTO ACCOUNTS OF THE USERS 308, process 300 for assisting users to sort financial transactions into user accounts based on transaction grouping data, account grouping data, and user grouping data analyzes user grouping data that defines groups of users of the financial management system based on how financial transactions of the users have been sorted into accounts of the users.

In one embodiment, once process 300 for assisting users to sort financial transactions into user accounts based on transaction grouping data, account grouping data, and user grouping data analyzes user grouping data that defines groups of users of the financial management system based on how financial transactions of the users have been sorted into accounts of the users at ANALYZE USER GROUPING DATA THAT DEFINES GROUPS OF USERS OF THE FINANCIAL MANAGEMENT SYSTEM BASED ON HOW FINANCIAL TRANSACTIONS OF THE USERS HAVE BEEN SORTED INTO ACCOUNTS OF THE USERS 308, process flow proceeds to ANALYZE MERCHANT GROUPING DATA THAT DEFINES GROUPS OF MERCHANTS ASSOCIATED WITH FINANCIAL TRANSACTIONS OF THE USERS BASED ON GROUPS OF ACCOUNTS THAT HAVE RECEIVED FINANCIAL TRANSACTIONS ASSOCIATED WITH THE MERCHANTS 310.

In one embodiment, at ANALYZE MERCHANT GROUPING DATA THAT DEFINES GROUPS OF MERCHANTS ASSOCIATED WITH FINANCIAL TRANSACTIONS OF THE USERS BASED ON GROUPS OF ACCOUNTS THAT HAVE RECEIVED FINANCIAL TRANSACTIONS ASSOCIATED WITH THE MERCHANTS 310 the process 300 for assisting users to sort financial transactions into user accounts based on transaction grouping data, account grouping data, and user grouping data analyzes merchant grouping data that defines groups of merchants associated with financial transactions of the users based on groups of accounts that have received financial transactions associated with the merchants.

In one embodiment, once process 300a for assisting users to sort financial transactions into user accounts based on transaction grouping data, account grouping data, and user grouping data analyzes merchant grouping data that defines groups of merchants associated with financial transactions of the users based on groups of accounts that have received financial transactions associated with the merchants at ANALYZE MERCHANT GROUPING DATA THAT DEFINES GROUPS OF MERCHANTS ASSOCIATED WITH FINANCIAL TRANSACTIONS OF THE USERS BASED ON GROUPS OF ACCOUNTS THAT HAVE RECEIVED FINANCIAL TRANSACTIONS ASSOCIATED WITH THE MERCHANTS 310, process flow proceeds to IDENTIFY A CANDIDATE ACCOUNT OF THE CURRENT USER BASED ON THE ANALYSIS OF THE ACCOUNT GROUPING DATA, THE USER GROUPING DATA, AND THE MERCHANT GROUPING DATA 312.

In one embodiment, at IDENTIFY A CANDIDATE ACCOUNT OF THE CURRENT USER BASED ON THE ANALYSIS OF THE ACCOUNT GROUPING DATA, THE USER GROUPING DATA, AND THE MERCHANT GROUPING DATA 312 the process 300 for assisting users to sort financial transactions into user accounts based on transaction grouping data, account grouping data, and user grouping data identifies a candidate account of the current user based on the analysis of the account grouping data, the user grouping data, and the merchant grouping data.

In one embodiment, once the process 300 for assisting users to sort financial transactions into user accounts based on transaction grouping data, account grouping data, and user grouping data identifies a candidate account of the current user based on the analysis of the account grouping data, the user grouping data, and the merchant grouping data at IDENTIFY A CANDIDATE ACCOUNT OF THE CURRENT USER BASED ON THE ANALYSIS OF THE ACCOUNT GROUPING DATA, THE USER GROUPING DATA, AND THE MERCHANT GROUPING DATA 312, process flow proceeds to ASSIST THE CURRENT USER TO SORT THE NEW FINANCIAL TRANSACTION INTO THE CANDIDATE ACCOUNT 314.

In one embodiment, at ASSIST THE CURRENT USER TO SORT THE NEW FINANCIAL TRANSACTION INTO THE CANDIDATE ACCOUNT 314 the process 300 for assisting users to sort financial transactions into user accounts based on transaction grouping data, account grouping data, and user grouping data assists the current user to sort the new financial transaction into the candidate account.

In one embodiment, once the process 300 for assisting users to sort financial transactions into user accounts based on transaction grouping data, account grouping data, and user grouping data assists the current user to sort the new financial transaction into the candidate account at ASSIST THE CURRENT USER TO SORT THE NEW FINANCIAL TRANSACTION INTO THE CANDIDATE ACCOUNT 314, process flow proceeds to END 316.

In one embodiment, at END 316 the process for assisting users to sort financial transactions into user accounts based on transaction grouping data, account grouping data, and user grouping data is exited to await new data and/or instructions.

Figure 4:
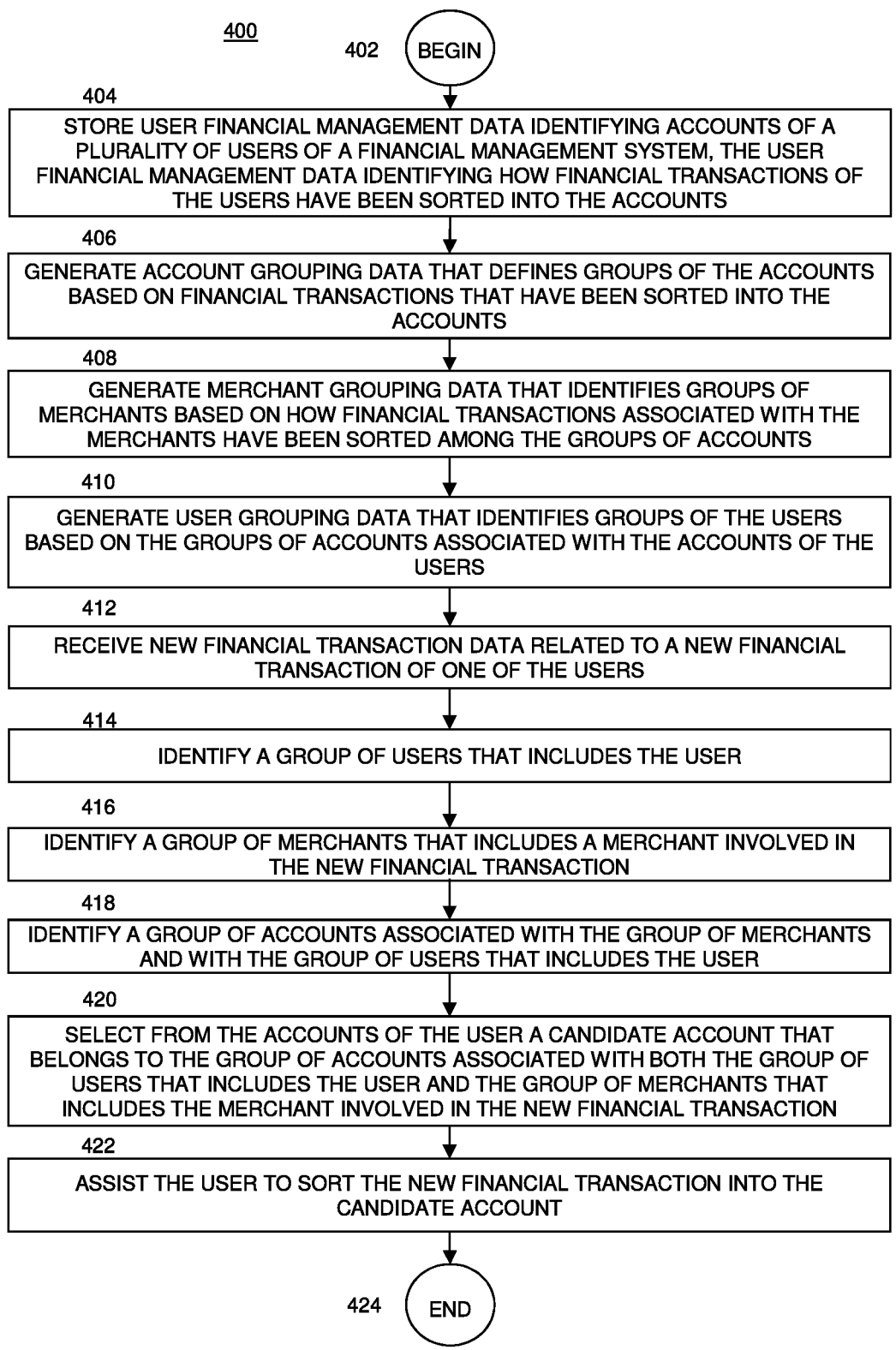
FIG. 4 is a flow diagram of a process for assisting users to sort financial transactions into user accounts based on transaction grouping data, account grouping data, and user grouping data, in accordance with one embodiment.

FIG. 4 illustrates a flow diagram of a process 400 for assisting users to sort financial transactions into user accounts based on transaction grouping data, account grouping data, and user grouping data, according to various embodiments.

In one embodiment, process 400 for assisting users to sort financial transactions into user accounts based on transaction grouping data, account grouping data, and user grouping data begins at BEGIN 402 and process flow proceeds to STORE USER FINANCIAL MANAGEMENT DATA IDENTIFYING ACCOUNTS OF A PLURALITY OF USERS OF A FINANCIAL MANAGEMENT SYSTEM, THE USER FINANCIAL MANAGEMENT DATA IDENTIFYING HOW FINANCIAL TRANSACTIONS OF THE USERS HAVE BEEN SORTED INTO THE ACCOUNTS 404.

In one embodiment, at STORE USER FINANCIAL MANAGEMENT DATA IDENTIFYING ACCOUNTS OF A PLURALITY OF USERS OF A FINANCIAL MANAGEMENT SYSTEM, THE USER FINANCIAL MANAGEMENT DATA IDENTIFYING HOW FINANCIAL TRANSACTIONS OF THE USERS HAVE BEEN SORTED INTO THE ACCOUNTS 404 process 400 for assisting users to sort financial transactions into user accounts based on transaction grouping data, account grouping data, and user grouping data stores user financial management data identifying accounts of a plurality of users of a financial management system, the user financial management data identifying how financial transactions of the users have been sorted into the accounts.

In one embodiment, once process 400 for assisting users to sort financial transactions into user accounts based on transaction grouping data, account grouping data, and user grouping data stores user financial management data identifying accounts of a plurality of users of a financial management system, the user financial management data identifying how financial transactions of the users have been sorted into the accounts at STORE USER FINANCIAL MANAGEMENT DATA IDENTIFYING ACCOUNTS OF A PLURALITY OF USERS OF A FINANCIAL MANAGEMENT SYSTEM, THE USER FINANCIAL MANAGEMENT DATA IDENTIFYING HOW FINANCIAL TRANSACTIONS OF THE USERS HAVE BEEN SORTED INTO THE ACCOUNTS 404 process flow proceeds to GENERATE ACCOUNT GROUPING DATA THAT DEFINES GROUPS OF THE ACCOUNTS BASED ON FINANCIAL TRANSACTIONS THAT HAVE BEEN SORTED INTO THE ACCOUNTS 406.

In one embodiment, at GENERATE ACCOUNT GROUPING DATA THAT DEFINES GROUPS OF THE ACCOUNTS BASED ON FINANCIAL TRANSACTIONS THAT HAVE BEEN SORTED INTO THE ACCOUNTS 406, process 400 for assisting users to sort financial transactions into user accounts based on transaction grouping data, account grouping data, and user grouping data generates account grouping data that defines groups of the accounts based on financial transactions that have been sorted into the accounts.

In one embodiment, once process 400 for assisting users to sort financial transactions into user accounts based on transaction grouping data, account grouping data, and user grouping data generates account grouping data that defines groups of the accounts based on financial transactions that have been sorted into the accounts at GENERATE ACCOUNT GROUPING DATA THAT DEFINES GROUPS OF THE ACCOUNTS BASED ON FINANCIAL TRANSACTIONS THAT HAVE BEEN SORTED INTO THE ACCOUNTS 406, process flow proceeds to GENERATE MERCHANT GROUPING DATA THAT IDENTIFIES GROUPS OF MERCHANTS BASED ON HOW FINANCIAL TRANSACTIONS ASSOCIATED WITH THE MERCHANTS HAVE BEEN SORTED AMONG THE GROUPS OF ACCOUNTS 408.

In one embodiment, at GENERATE MERCHANT GROUPING DATA THAT IDENTIFIES GROUPS OF MERCHANTS BASED ON HOW FINANCIAL TRANSACTIONS ASSOCIATED WITH THE MERCHANTS HAVE BEEN SORTED AMONG THE GROUPS OF ACCOUNTS 408, process 400 for assisting users to sort financial transactions into user accounts based on transaction grouping data, account grouping data, and user grouping data generates merchant grouping data that identifies groups of merchants based on how financial transactions associated with the merchants have been sorted among the groups of accounts.

In one embodiment, once process 400 for assisting users to sort financial transactions into user accounts based on transaction grouping data, account grouping data, and user grouping data generates merchant grouping data that identifies groups of merchants based on how financial transactions associated with the merchants have been sorted among the groups of accounts at GENERATE MERCHANT GROUPING DATA THAT IDENTIFIES GROUPS OF MERCHANTS BASED ON HOW FINANCIAL TRANSACTIONS ASSOCIATED WITH THE MERCHANTS HAVE BEEN SORTED AMONG THE GROUPS OF ACCOUNTS 408, process flow proceeds to GENERATE USER GROUPING DATA THAT IDENTIFIES GROUPS OF THE USERS BASED ON THE GROUPS OF ACCOUNTS ASSOCIATED WITH THE ACCOUNTS OF THE USERS 410.

In one embodiment, at GENERATE USER GROUPING DATA THAT IDENTIFIES GROUPS OF THE USERS BASED ON THE GROUPS OF ACCOUNTS ASSOCIATED WITH THE ACCOUNTS OF THE USERS 410 the process 400 or assisting users to sort financial transactions into user accounts based on transaction grouping data, account grouping data, and user grouping data generates user grouping data that identifies groups of the users based on the groups of accounts associated with the accounts of the users.

In one embodiment, once process 400 or assisting users to sort financial transactions into user accounts based on transaction grouping data, account grouping data, and user grouping data generates user grouping data that identifies groups of the users based on the groups of accounts associated with the accounts of the users at GENERATE USER GROUPING DATA THAT IDENTIFIES GROUPS OF THE USERS BASED ON THE GROUPS OF ACCOUNTS ASSOCIATED WITH THE ACCOUNTS OF THE USERS 410, process flow proceeds to RECEIVE NEW FINANCIAL TRANSACTION DATA RELATED TO A NEW FINANCIAL TRANSACTION OF ONE OF THE USERS 412.

In one embodiment, at RECEIVE NEW FINANCIAL TRANSACTION DATA RELATED TO A NEW FINANCIAL TRANSACTION OF ONE OF THE USERS 412 the process 400 for assisting users to sort financial transactions into user accounts based on transaction grouping data, account grouping data, and user grouping data receives new financial transaction data related to a new financial transaction of one of the users.

In one embodiment, once the process 400 for assisting users to sort financial transactions into user accounts based on transaction grouping data, account grouping data, and user grouping data receives new financial transaction data related to a new financial transaction of one of the users at RECEIVE NEW FINANCIAL TRANSACTION DATA RELATED TO A NEW FINANCIAL TRANSACTION OF ONE OF THE USERS 412, process flow proceeds to IDENTIFY A GROUP OF USERS THAT INCLUDES THE USER 414.

In one embodiment, at IDENTIFY A GROUP OF USERS THAT INCLUDES THE USER 414 the process 400 for assisting users to sort financial transactions into user accounts based on transaction grouping data, account grouping data, and user grouping data identifies a group of users that includes the user.

In one embodiment, once the process 400 for assisting users to sort financial transactions into user accounts based on transaction grouping data, account grouping data, and user grouping data identifies a group of users that includes the user at IDENTIFY A GROUP OF USERS THAT INCLUDES THE USER 414, process flow proceeds to IDENTIFY A GROUP OF MERCHANTS THAT INCLUDES A MERCHANT INVOLVED IN THE NEW FINANCIAL TRANSACTION 416.

In one embodiment, at IDENTIFY A GROUP OF MERCHANTS THAT INCLUDES A MERCHANT INVOLVED IN THE NEW FINANCIAL TRANSACTION 416 the process 400 for assisting users to sort financial transactions into user accounts based on transaction grouping data, account grouping data, and user grouping data identifies a group of merchants that includes a merchant involved in the new financial transaction.

In one embodiment, once the process 400 for assisting users to sort financial transactions into user accounts based on transaction grouping data, account grouping data, and user grouping data identifies a group of merchants that includes a merchant involved in the new financial transaction at IDENTIFY A GROUP OF MERCHANTS THAT INCLUDES A MERCHANT INVOLVED IN THE NEW FINANCIAL TRANSACTION 416, process flow proceeds to IDENTIFY A GROUP OF ACCOUNTS ASSOCIATED WITH THE GROUP OF MERCHANTS AND WITH THE GROUP OF USERS THAT INCLUDES THE USER 418.

In one embodiment, at IDENTIFY A GROUP OF ACCOUNTS ASSOCIATED WITH THE GROUP OF MERCHANTS AND WITH THE GROUP OF USERS THAT INCLUDES THE USER 418 the process 400 for assisting users to sort financial transactions into user accounts based on transaction grouping data, account grouping data, and user grouping data identifies a group of accounts associated with the group of merchants and with the group of users that includes the user.

In one embodiment, once the process 400 for assisting users to sort financial transactions into user accounts based on transaction grouping data, account grouping data, and user grouping data identifies a group of accounts associated with the group of merchants and with the group of users that includes the user at IDENTIFY A GROUP OF ACCOUNTS ASSOCIATED WITH THE GROUP OF MERCHANTS AND WITH THE GROUP OF USERS THAT INCLUDES THE USER 418, process flow proceeds to SELECT FROM THE ACCOUNTS OF THE USER A CANDIDATE ACCOUNT THAT BELONGS TO THE GROUP OF ACCOUNTS ASSOCIATED WITH BOTH THE GROUP OF USERS THAT INCLUDES THE USER AND THE GROUP OF MERCHANTS THAT INCLUDES THE MERCHANT INVOLVED IN THE NEW FINANCIAL TRANSACTION 420.

In one embodiment, at SELECT FROM THE ACCOUNTS OF THE USER A CANDIDATE ACCOUNT THAT BELONGS TO THE GROUP OF ACCOUNTS ASSOCIATED WITH BOTH THE GROUP OF USERS THAT INCLUDES THE USER AND THE GROUP OF MERCHANTS THAT INCLUDES THE MERCHANT INVOLVED IN THE NEW FINANCIAL TRANSACTION 420 the process 400 for assisting users to sort financial transactions into user accounts based on transaction grouping data, account grouping data, and user grouping data selects from the accounts of the user a candidate account that belongs to the group of accounts associated with both the group of users that includes the user and the group of merchants that includes the merchant involved in the new financial transaction.

In one embodiment, once the process 400 for assisting users to sort financial transactions into user accounts based on transaction grouping data, account grouping data, and user grouping data selects from the accounts of the user a candidate account that belongs to the group of accounts associated with both the group of users that includes the user and the group of merchants that includes the merchant involved in the new financial transaction at SELECT FROM THE ACCOUNTS OF THE USER A CANDIDATE ACCOUNT THAT BELONGS TO THE GROUP OF ACCOUNTS ASSOCIATED WITH BOTH THE GROUP OF USERS THAT INCLUDES THE USER AND THE GROUP OF MERCHANTS THAT INCLUDES THE MERCHANT INVOLVED IN THE NEW FINANCIAL TRANSACTION 420, process flow proceeds to ASSIST THE USER TO SORT THE NEW FINANCIAL TRANSACTION INTO THE CANDIDATE ACCOUNT 422

In one embodiment, at ASSIST THE USER TO SORT THE NEW FINANCIAL TRANSACTION INTO THE CANDIDATE ACCOUNT 422 the process 400 for assisting users to sort financial transactions into user accounts based on transaction grouping data, account grouping data, and user grouping data assists the user to sort the new financial transaction into the candidate account.

In one embodiment, once the process 400 for assisting users to sort financial transactions into user accounts based on transaction grouping data, account grouping data, and user grouping data assists the user to sort the new financial transaction into the candidate account at ASSIST THE USER TO SORT THE NEW FINANCIAL TRANSACTION INTO THE CANDIDATE ACCOUNT 422, process flow proceeds to END 424.

In one embodiment, at END 424 the process for assisting users to sort financial transactions into user accounts based on transaction grouping data, account grouping data, and user grouping data is exited to await new data and/or instructions.

As noted above, the specific illustrative examples discussed above are but illustrative examples of implementations of embodiments of the method or process for assisting users to sort financial transactions into user accounts based on transaction grouping data, account grouping data, and user grouping data. Those of skill in the art will readily recognize that other implementations and embodiments are possible. Therefore, the discussion above should not be construed as a limitation on the claims provided below.

In one embodiment, a computing system implemented method assists users to sort financial transactions into user accounts. The method includes storing user financial management data identifying accounts of a plurality of users of a financial management system. The user financial management data identifies how financial transactions of the users have been sorted into the accounts. The method includes generating account grouping data that defines groups of the accounts based on financial transactions that have been sorted into the accounts, generating transaction grouping data that identifies groups of merchants based on how financial transactions associated with the merchants have been sorted among the groups of accounts, and generating user grouping data that identifies groups of the users based on the groups of accounts associated with the accounts of the users. The method includes receiving new financial transaction data related to a new financial transaction of one of the users, identifying a group of users that includes the user, and identifying a group of merchants that includes a merchant involved in the new financial transaction. The method includes identifying a group of accounts associated with the group of merchants and with the group of users that includes the user. The method includes selecting from the accounts of the user a candidate account that belongs to the group of accounts associated with both the group of users that includes the user and the group of merchants that includes the merchant involved in the new financial transaction, and assisting the user to sort the new financial transaction into the candidate account.

In one embodiment, a computing system implemented method assists users to sort financial transactions into user accounts. The method includes storing user financial management data identifying accounts of a plurality of users of a financial management system. The user financial management data identifies how financial transactions of the users have been sorted into the accounts. The method includes generating account grouping data that defines groups of the accounts based on financial transactions that have been sorted into the accounts, generating transaction grouping data that identifies groups of financial transactions based on characteristics of the financial transactions, and generating user grouping data that identifies groups of the users based on the groups of accounts associated with the accounts of the users. The method includes receiving new financial transaction data related to a new financial transaction of one of the users, identifying a group of users that includes the user, and identifying a group of financial transactions that fits the new financial transaction. The method includes identifying a group of accounts associated with the group of financial transactions and with the group of users that includes the user. The method includes selecting from the accounts of the user a candidate account that belongs to the group of accounts associated with both the group of users that includes the user and the group of financial transactions that fits the new financial transaction, and assisting the user to sort the new financial transaction into the candidate account.

In one embodiment, a non-transitory computer-readable medium has a plurality of computer-executable instructions which, when executed by a processor, perform a method for assisting users to sort financial transactions into user accounts based on transaction grouping data, account grouping data, and user grouping data. The instructions include a user interface module configured to receive user data related to a plurality of users of a financial system. The instructions include a data acquisition module configured to gather financial transaction data related to financial transactions of the users. The financial transaction data includes merchant identification data indicating, for each financial transaction, a merchant associated with the financial transaction. The instructions include an account database configured to store account data that identifies, for each of the users, a respective plurality of accounts. The instructions include a grouping analytics module configured to generate account grouping data defining groups of the accounts based on the merchants involved in the financial transactions assigned to the accounts. The grouping analytics module is configured to generate transaction grouping data defining groups of merchants based on the groups of accounts that include financial transactions involving the merchants. The grouping analytics module is configured to generate user grouping data defining groups of users of the financial management system based on the how the users sort financial transactions into the accounts of the user. The grouping analytics module is configured to assist users to sort new financial transactions into accounts of the users based on the account grouping data, the transaction grouping data, and the user grouping data.

In one embodiment, a system assists users to sort financial transactions into user accounts based on transaction grouping data, account grouping data, and user grouping data. The system includes at least one processor and at least one memory coupled to the at least one processor. The at least one memory has stored therein instructions which, when executed by any set of the one or more processors, perform a process including receiving financial transaction data related to a new financial transaction of a current user of a financial management system. The process includes analyzing account grouping data that defines groups of accounts of users of the financial management system based on how financial transactions of the users of the financial management system have been sorted into the accounts. The process includes analyzing user grouping data that defines groups of users of the financial management system based on how financial transactions of the users have been sorted into accounts of the users. The process includes analyzing transaction grouping data that defines groups of merchants associated with financial transactions of the users based on groups of accounts that have received financial transactions associated with the merchants. The process includes identifying a candidate account of the current user based on the analysis of the account grouping data, the user grouping data, and the transaction grouping data. The process includes assisting the current user to sort the new financial transaction into the candidate account.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

As discussed in more detail above, using the above embodiments, with little or no modification and/or input, there is considerable flexibility, adaptability, and opportunity for customization to meet the specific needs of various parties under numerous circumstances.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating", "accessing", "adding", "aggregating", "alerting", "applying", "analyzing", "associating", "calculating", "capturing", "categorizing", "classifying", "comparing", "creating", "defining", "detecting", "determining", "distributing", "eliminating", "encrypting", "extracting", "filtering", "forwarding", "generating", "identifying", "implementing", "informing", "monitoring", "obtaining", "posting", "processing", "providing", "receiving", "requesting", "saving", "sending", "storing", "substituting", "transferring", "transforming", "transmitting", "using", etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as discussed herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A computing system implemented method for assisting users to sort financial transactions into user accounts, the method comprising:
    storing user financial management data identifying accounts of a plurality of users of a financial management system, the user financial management data identifying how financial transactions of the users have been sorted into the accounts;
    generating account grouping data that defines groups of the accounts based on financial transactions that have been sorted into the accounts, wherein generating the account grouping data includes:
        generating account characteristics vector data that includes, for each distinct account, a respective account characteristics vector, each account characteristics vector including a plurality of data fields, wherein each data field of an account characteristics vector represents a merchant or a group of merchants, and the data value of each data field is an indication of a number, frequency, or rate of financial transactions sorted into that account, which involve the merchant or group of merchants associated with that data field; and
        grouping the accounts, by applying one or more clustering algorithms to the account characteristics vector data to identify similarities in the account characteristics vectors, wherein similarities in the account characteristics vectors are determined based on analysis of the data values in the data fields of each of the account characteristics vectors;
    generating merchant grouping data that identifies groups of merchants based on how financial transactions associated with the merchants have been sorted among the groups of accounts wherein generating the merchant grouping data includes:
        generating transaction characteristics vector data that includes, for each distinct merchant involved in one or more of the financial transactions, a respective transaction characteristics vector, each transaction characteristics vector including a plurality of data fields, wherein each data field of a transaction characteristics vector represents an account or a group of accounts, and the data value of each data field is an indication of a number, frequency, or rate of financial transactions involving that merchant, which have been sorted into the account associated with that data field; and
        grouping the merchants, by applying one or more clustering algorithms to the transaction characteristics vector data to identify similarities in the transaction characteristics vectors, wherein similarities in the transaction characteristics vectors are determined based on analysis of the data values in the data fields of each of the transaction characteristics vectors;
    generating user grouping data that identifies groups of the users based on the groups of accounts associated with the accounts of the users wherein generating the user grouping data includes:
        generating user characteristics vector data that includes, for each distinct user, a respective user characteristics vector, each user characteristics vector including a plurality of data fields, wherein each data field of a user characteristics vector represents an account or a group of accounts, and the data value of each data field is an indication of whether the user has an account that is included in the group of accounts corresponding to the data field; and
        grouping the users, by applying one or more clustering algorithms to the user characteristics vector data to identify similarities in the user characteristics vectors, wherein similarities in the user characteristics vectors are determined based on analysis of the data values in the data fields of each of the user characteristics vectors;
    receiving new financial transaction data related to a new financial transaction of one of the users;
    identifying a group of users that includes the user;
    identifying a group of merchants that includes a merchant involved in the new financial transaction;
    identifying a group of accounts associated with the group of merchants and with the group of users that includes the user;
    selecting from the accounts of the user a candidate account that belongs to the group of accounts associated with both the group of users that includes the user and the group of merchants that includes the merchant involved in the new financial transaction; and
    assisting the user to sort the new financial transaction into the candidate account.

2. The method of claim 1, wherein assisting the user to sort the financial transaction into the account includes:
    generating message data identifying the candidate account; and
    outputting the message data to the user.

3. The method of claim 2, wherein the message data prompts the user to sort the new financial transaction into the candidate account.

4. The method of claim 3, wherein the message data prompts the user to approve or confirm sorting of the new financial transaction into the candidate account.

5. The method of claim 2, including selecting from the accounts of the user multiple candidate accounts that belong to the group of accounts associated with both the group of users and the group of merchants that includes the merchant involved in the new financial transaction.

6. The method of claim 5, wherein the message data identifies the multiple candidate accounts and prompts the user to sort the new financial transaction into one of the candidate accounts.

7. The method of claim 6, wherein the message data displays the multiple candidate accounts in order of probability of being a correct account for the new financial transaction.

8. The method of claim 6, wherein the message data displays most prominently a candidate account that has the highest probability of being a correct account for the new financial transaction.

9. The method of claim 1, further comprising automatically sorting the new financial transaction into the candidate account if the candidate account has a probability greater than a threshold probability of being a correct account for the new financial transaction.

10. The method of claim 1, wherein selecting the candidate account includes:
analyzing characteristics of the new financial transaction; and
selecting a candidate account from multiple accounts of the user based on how strongly the characteristics of the new financial transaction predict inclusion in the candidate account.

11. The method of claim 1, further comprising assigning, for each group of accounts associated with the group of users that includes the user, weights to types of financial transaction characteristics based on how strongly the types of financial transaction characteristics predict inclusion in the group of accounts.

12. The method of claim 11, further comprising selecting the candidate account based on how strongly characteristics of the new financial transaction predict inclusion in the group of accounts that includes the candidate account.

13. The method of claim 12, wherein the characteristics of the new financial transaction include one or more of:
a day of the week associated with the financial transaction;
a time of day associated with the financial transaction;
a business category code;
an address;
a name of the merchant associated with the new financial transaction;
a group of merchants that includes the merchant associated with the new financial transaction;
a financial institution associated with the new financial transaction; and
a monetary value of the new financial transaction.

14. The method of claim 11, wherein assigning weights includes assigning weights based on reducing prediction loss over a separate cross-validation set of financial transactions.

15. The method of claim 1, wherein selecting the candidate account includes performing one or more of a Naïve Bayes classification methodology, a logistic regression analysis, or a k-nearest neighbor algorithm on accounts of the user.

16. The method of claim 1, further comprising periodically updating the account grouping data, the merchant grouping data, and the user grouping data.

17. The method of claim 1, wherein the accounts correspond to financial transaction book-keeping categories.

18. A system for assisting users to sort financial transactions into user accounts based on merchant grouping data, account grouping data, and user grouping data, the system comprising:
at least one processor; and
at least one memory coupled to the at least one processor, the at least one memory having stored therein instructions which, when executed by any set of the one or more processors, perform a process including:
receiving financial transaction data related to a new financial transaction of a current user of a financial management system;
analyzing account grouping data that defines groups of accounts of users of the financial management system based on how financial transactions of the users of the financial management system have been sorted into the accounts, wherein defining groups of accounts includes:
generating account characteristics vector data that includes, for each distinct account, a respective account characteristics vector, each account characteristics vector including a plurality of data fields, wherein each data field of an account characteristics vector represents a merchant or a group of merchants, and the data value of each data field is an indication of a number, frequency, or rate of financial transactions sorted into that account, which involve the merchant or group of merchants associated with that data field; and
grouping the accounts, by applying one or more clustering algorithms to the account characteristics vector data to identify similarities in the account characteristics vectors, wherein similarities in the account characteristics vectors are determined based on analysis of the data values in the data fields of each of the account characteristics vectors;
analyzing user grouping data that defines groups of users of the financial management system based on how financial transactions of the users have been sorted into accounts of the users, wherein defining groups of users includes:
generating user characteristics vector data that includes, for each distinct user, a respective user characteristics vector, each user characteristics vector including a plurality of data fields, wherein each data field of a user characteristics vector represents an account or a group of accounts, and the data value of each data field is an indication of whether the user has an account that is included in the group of accounts corresponding to the data field; and
grouping the users, by applying one or more clustering algorithms to the user characteristics vector data to identify similarities in the user characteristics vectors, wherein similarities in the user characteristics vectors are determined based on analysis of the data values in the data fields of each of the user characteristics vectors;

analyzing merchant grouping data that defines groups of merchants associated with financial transactions of the users based on groups of accounts that have received financial transactions associated with the merchants, wherein defining groups of merchants includes:

generating transaction characteristics vector data that includes, for each distinct merchant involved in one or more of the financial transactions, a respective transaction characteristics vector, each transaction characteristics vector including a plurality of data fields, wherein each data field of a transaction characteristics vector represents an account or a group of accounts, and the data value of each data field is an indication of a number, frequency, or rate of financial transactions involving that merchant, which have been sorted into the account associated with that data field; and grouping the merchants, by applying one or more clustering algorithms to the transaction characteristics vector data to identify similarities in the transaction characteristics vectors, wherein similarities in the transaction characteristics vectors are determined based on analysis of the data values in the data fields of each of the transaction characteristics vectors;

identifying a candidate account of the current user based on the analysis of the account grouping data, the user grouping data, and the merchant grouping data; and assisting the current user to sort the new financial transaction into the candidate account.

19. The system of claim 18, wherein the financial management system is a book-keeping system.

20. The system of claim 19, wherein the accounts of the users correspond to book-keeping categories for sorting financial transactions of the user.

21. The system of claim 19, further comprising storing user financial management data that includes account data related to a respective plurality of accounts for each user.

22. The system of claim 21, wherein the financial management data identifies, for each financial transaction of the users, an account into which the financial transaction has been sorted.

23. The system of claim 18, wherein each financial transaction includes a merchant identifier that identifies a merchant involved in the financial transaction.

24. The system of claim 23, wherein the merchant identifier includes merchant string data.

25. The system of claim 18, wherein the user analyzing the user grouping data includes identifying a group of users that includes the current users.

26. The system of claim 18, wherein analyzing the merchant grouping data includes identifying a group of merchants that includes the merchant involved in the new financial transaction.

27. The system of claim 18, wherein analyzing the account grouping data includes identifying groups of accounts that are associated with both the group of merchants that includes the merchant involved in the new financial transaction and the group of users that includes the current user.

28. The system of claim 18, wherein selecting the candidate account includes identifying accounts of the current user that are included in the groups of accounts that are associated with both the group of merchants that includes the merchant involved in the new financial transaction and the group of users that includes the current user.

29. The system of claim 28, wherein selecting the candidate account includes:

analyzing the accounts of the current user that are included in the groups of accounts that are associated with both the group of merchants that includes the merchant involved in the new financial transaction and the group of users that includes the current user; and determining an account of the current user that best fits the new financial transaction.

30. The system of claim 29, wherein determining an account of the current user that best fits inclusion of the new financial transaction includes comparing, for one or more accounts of the user included in the groups of accounts, characteristics of the new financial transaction to characteristics of financial transactions that best predict inclusion in the one or more groups of accounts.

31. The system of claim 30, wherein selecting the candidate account includes selecting the candidate account based on weights assigned to the characteristics of the financial transactions.

* * * * *